(12) United States Patent  
You et al.

(10) Patent No.: US 10,701,733 B2  
(45) Date of Patent: Jun. 30, 2020

(54) TRANSMISSION RESOURCE OBTAINING METHOD AND USER EQUIPMENT

(71) Applicant: HUAWEI TECHNOLOGIES CO., LTD., Shenzhen, Guangdong (CN)

(72) Inventors: Chunhua You, Shanghai (CN); Qufang Huang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/045,703

(22) Filed: Jul. 25, 2018

(65) Prior Publication Data

US 2018/0332626 A1    Nov. 15, 2018

Related U.S. Application Data

(63) Continuation of application No. PCT/CN2016/072320, filed on Jan. 27, 2016.

(51) Int. Cl.
  *H04W 74/08* (2009.01)
  *H04W 74/00* (2009.01)
  *H04W 72/04* (2009.01)

(52) U.S. Cl.
  CPC ..... *H04W 74/0833* (2013.01); *H04W 72/042* (2013.01); *H04W 72/0446* (2013.01); *H04W 74/00* (2013.01)

(58) Field of Classification Search
  CPC ........... H04W 72/042; H04W 72/0446; H04W 74/0833
  USPC .......................................................... 370/329
  See application file for complete search history.

(56) References Cited

U.S. PATENT DOCUMENTS

| | | | |
|---|---|---|---|
| 2012/0176967 | A1 | 7/2012 | Kim et al. |
| 2013/0121258 | A1 | 5/2013 | Mukherjee et al. |
| 2013/0242730 | A1 | 9/2013 | Pelletier et al. |
| 2013/0301541 | A1* | 11/2013 | Mukherjee ........ H04W 74/0833 370/329 |
| 2014/0064203 | A1* | 3/2014 | Seo ........................ H04W 28/06 370/329 |

(Continued)

FOREIGN PATENT DOCUMENTS

| | | |
|---|---|---|
| CN | 102548014 A | 7/2012 |
| CN | 104170491 A | 11/2014 |

(Continued)

*Primary Examiner* — Phong La  
(74) *Attorney, Agent, or Firm* — Womble Bond Dickinson (US) LLP

(57) ABSTRACT

A transmission resource obtaining method and user equipment are provided. The transmission resource obtaining method includes: receiving first configuration information sent by an base station, and obtaining request resources based on the first configuration information, where the request resources include a scheduling request (SR) resource and a physical random access channel (PRACH) resource; determining a target request resource from the request resources based on time information of user equipment, where the target request resource includes the SR resource and/or the PRACH resource; and sending an uplink resource request to the base station by using the target request resource. The technical solutions in the embodiments of the present invention help improve uplink transmission resource obtaining efficiency.

18 Claims, 5 Drawing Sheets

(56) References Cited

U.S. PATENT DOCUMENTS

| | | | |
|---|---|---|---|
| 2015/0016350 A1* | 1/2015 | Moulsley | H04W 72/0453 |
| | | | 370/329 |
| 2015/0049697 A1 | 2/2015 | Worrall et al. | |
| 2015/0049712 A1* | 2/2015 | Chen | H04W 72/1215 |
| | | | 370/329 |
| 2015/0282214 A1 | 10/2015 | Lee et al. | |
| 2015/0312957 A1* | 10/2015 | Pelletier | H04W 74/04 |
| | | | 370/329 |
| 2015/0327245 A1* | 11/2015 | Zhu | H04W 72/02 |
| | | | 370/329 |
| 2016/0183299 A1* | 6/2016 | Fang | H04W 74/04 |
| | | | 370/329 |
| 2016/0302076 A1* | 10/2016 | Chou | H04W 16/14 |
| 2017/0013570 A1* | 1/2017 | Vajapeyam | H04W 52/365 |
| 2017/0135135 A1 | 5/2017 | Pelletier et al. | |
| 2017/0149541 A1* | 5/2017 | Zhu | H04W 28/08 |
| 2017/0303220 A1* | 10/2017 | Sadeghi | H04L 5/0053 |
| 2017/0339717 A1* | 11/2017 | Futaki | H04W 16/14 |
| 2018/0220318 A1* | 8/2018 | Uemura | H04B 17/318 |
| 2018/0241525 A1* | 8/2018 | Ouchi | H04W 16/14 |
| 2019/0274183 A1* | 9/2019 | Pelletier | H04W 52/365 |

FOREIGN PATENT DOCUMENTS

| | | |
|---|---|---|
| CN | 104186010 A | 12/2014 |
| JP | 2016-500979 A | 1/2016 |
| KR | 2009-0082867 A | 7/2009 |
| KR | 2012-0081558 A | 7/2012 |
| KR | 2013-0097586 A | 9/2013 |
| WO | 2015139032 A1 | 9/2015 |

\* cited by examiner

TRANSMISSION RESOURCE OBTAINING METHOD AND USER EQUIPMENT

CROSS-REFERENCE TO RELATED APPLICATIONS

This application is a continuation of International Application No. PCT/CN2016/072320, filed on Jan. 27, 2016, the disclosure of which is hereby incorporated by reference in its entirety.

TECHNICAL FIELD

The present invention relates to the field of communications technologies, and in particular, to a transmission resource obtaining method and user equipment.

BACKGROUND

In a Long Term Evolution (LTE or LTE-Advanced, LTE/LTE-A) system, before sending received data, user equipment usually needs to obtain permission from a base station, that is, the user equipment needs to apply to the base station for an uplink transmission resource. The base station makes a scheduling decision after receiving the application, to determine whether to provide a corresponding service for the user equipment.

Currently, the user equipment applies to the base station for the uplink transmission resource in two main manners. In a first manner, when the base station has configured a scheduling request (SR) resource for the user equipment, the user equipment may apply to the base station for the uplink transmission resource by using the SR resource. In a second manner, when the base station configures no SR resource for the user equipment, the user equipment needs to first perform a random access process and then send data. When the base station can configure the SR resource for the user equipment, there are different cell scenarios. For example, in a cell scenario in which clear channel assessment (CCA) detection is performed, because a licensed cell for coverage is short of resource, an SR resource configuration period may be relatively long, and a relatively long time may be consumed to obtain the uplink transmission resource by using the SR resource. In a cell scenario in which CCA detection is not performed, before sending an SR to the base station by using the SR resource, to apply for the uplink transmission resource, the user equipment needs to complete a listen before talk (LBT) process; the user equipment can send data only when determining that a channel is idle; and if LBT fails, the user equipment fails to send data and therefore fails to apply for the uplink transmission resource, and the user equipment needs to apply for a resource again. Therefore, uplink transmission resource obtaining efficiency is low in both the manners.

SUMMARY

Embodiments of the present invention provide a transmission resource obtaining method and user equipment, so as to improve uplink transmission resource obtaining efficiency by combining an SR resource and a physical random access channel (PRACH) resource.

A first aspect of the embodiments of the present invention provides a transmission resource obtaining method, including:

receiving first configuration information sent by an base station, and obtaining request resources based on the first configuration information, where the request resources include an SR resource and a PRACH resource;

determining a target request resource from the request resources based on time information of user equipment, where the target request resource may be the SR resource and/or the PRACH resource; and sending an uplink resource request to the base station by using the target request resource, to obtain an uplink transmission resource, where the uplink resource request includes an SR and/or a preamble.

In the foregoing technical solution, the first configuration message sent by the base station is received, and the request resources are obtained based on the first configuration message. Then, the target request resource is determined based on the cell time information. Finally, the corresponding target request is sent to the base station by using the target request resource. The SR resource and the PRACH resource are combined, and the target request resource is selected based on the cell time information, to send the uplink resource request to the base station. Therefore, a resource obtaining time can be shortened, and uplink transmission resource obtaining efficiency can be improved.

In one embodiment, the obtaining request resources based on the first configuration information includes:

if learning, based on the first configuration information, that all the request resources, namely, the SR resource and the PRACH resource, belong to a first-type cell, obtaining the request resources from the first-type cell; or if learning, based on the first configuration information, that the PRACH resource belongs to a first-type cell and the SR resource belongs to a second-type cell, respectively obtaining, by the user equipment, the request resources from the first-type cell and the second-type cell, where the first-type cell includes a cell in which CCA detection needs to be performed before to-be-transmitted data is sent, and the second-type cell includes a cell in which CCA detection does not need to be performed before to-be-transmitted data is sent.

In one embodiment, the determining a target request resource from the request resources based on time information of user equipment includes:

if the SR resource in the request resources is obtained from the second-type cell, determining, by the user equipment, a priority of the to-be-transmitted data of the user equipment based on second configuration information received from the base station; and if the to-be-transmitted data of the user equipment includes only first-priority data, namely, high-priority data, determining, from the request resources based on the time information of the user equipment, that the target request resource is the SR resource; or if the to-be-transmitted data of the user equipment includes second-priority data, namely, low-priority data, determining the target request resource from the request resources according to a time precedence principle and based on the time information of the user equipment.

In the foregoing technical solution, if the SR resource is obtained from the second-type cell, the target request resource is determined based on a priority of the data. If the data is the first-priority data, only the SR resource can be used, to send an SR to request the uplink transmission resource. If the data is the second-priority data, determining may be further performed based on the time precedence principle. The target request resource can be more quickly obtained in a priority-based manner.

In one embodiment, the determining a target request resource from the request resources based on time information of user equipment includes:

if the request resources are obtained from the first-type cell, determining the target request resource from the request resources according to a time precedence principle and based on the time information of the user equipment.

In one embodiment, the determining a target request resource from the request resources based on time information of user equipment includes:

if the SR resource is selected from the request resources according to the time precedence principle and based on the time information of the user equipment, using the SR resource as the target request resource; or if the PRACH resource is selected from the request resources according to the time precedence principle and based on the time information of the user equipment, using the PRACH resource as the target request resource; or if both the SR resource and the PRACH resource are selected from the request resources according to the time precedence principle and based on the time information of the user equipment, determining the target request resource from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In the foregoing technical solution, the target request resource is determined based on the time precedence principle. In addition, when both the SR resource and the PRACH resource are selected, a final target request resource is determined based on a pre-configuration of the base station. Therefore, the request resource can be determined more flexibly.

In one embodiment, the sending an uplink resource request to the base station by using the target request resource includes:

if the target request resource is the SR resource, sending an SR to the base station by using the SR resource; or if the target request resource is the PRACH resource, sending a preamble to the base station by using the PRACH resource.

In one embodiment, before the sending a target request by using the target request resource, to obtain an uplink transmission resource, the method further includes:

if the request resources are obtained from the first-type cell, determining whether a transmit channel of the target request is idle; and if the transmit channel of the target request is idle, performing the step of sending an uplink resource request to the base station by using the target request resource; or if the transmit channel of the target request is not idle, performing the step of determining a target request resource from the request resources based on time information of user equipment.

In one embodiment, after the sending an uplink resource request to the base station by using the target request resource, the method further includes:

if downlink control information (Downlink control information, DCI) sent by the base station is received, prolonging receiving duration of a started window timer or starting a window timer whose receiving duration is set; and if no random access response RAR sent by the base station is received within the receiving duration, performing the step of sending an uplink resource request to the base station by using the target request resource.

In the foregoing technical solution, in a random access process, it may be learned, based on the received DCI, that the current base station has been ready to allocate the uplink transmission resource to the user equipment. Therefore, the receiving duration of the started window timer is prolonged or the window timer that is not started and whose receiving duration is set is started, so that a receiving waiting time can be controlled, and correct receiving of the uplink transmission resource can be ensured.

In one embodiment, after the sending a preamble to the base station by using the PRACH resource, the method further includes:

starting a preamble prohibition timer; and if the user equipment has not received a contention success message when a preset timeout interval of the preamble prohibition timer expires, performing the step of determining a target request resource from the request resources based on time information of user equipment.

In one embodiment, after the sending a preamble to the base station by using the PRACH resource, the method further includes:

if a preamble counter has not been started, starting the preamble counter; or if the preamble counter has been started, performing counting by using the preamble counter; and prohibiting preamble sending if the user equipment has not received a contention success message when the preamble counter reaches a preset maximum quantity of transmission times.

In one embodiment, after the sending a preamble to the base station by using the PRACH resource, the method further includes:

starting a preamble prohibition timer;

if a preamble counter has not been started, starting the preamble counter;

if the user equipment has not received a contention success message when a preset timeout interval of the preamble prohibition timer expires and before the preamble counter reaches a preset maximum quantity of transmission times, performing the step of determining a target request resource from the request resources based on time information of user equipment; and prohibiting preamble sending when the preamble counter reaches the preset maximum quantity of transmission times.

In one embodiment, after the sending an SR to the base station by using the SR resource, the method further includes:

starting an SR prohibition timer; and if the user equipment has not received an uplink transmission resource when a preset timeout interval of the SR prohibition timer expires, performing the step of determining a target request resource from the request resources based on time information of user equipment.

In one embodiment, after the sending an SR to the base station by using the SR resource, the method further includes:

if an SR counter has not been started, starting the SR counter; or if the SR counter has been started, performing counting by using the SR counter; and if the user equipment has not received an uplink transmission resource when the SR counter reaches a preset maximum quantity of transmission times, releasing the SR resource, and performing the step of determining a target request resource from the request resources based on time information of user equipment.

In one embodiment, after the sending an SR to the base station by using the SR resource, the method further includes:

starting an SR prohibition timer;

if an SR counter has not been started, starting the SR counter;

if the user equipment has not received an uplink transmission resource when a preset timeout interval of the SR prohibition timer expires and before the SR counter reaches a preset maximum quantity of transmission times, performing the step of determining a target request resource from the request resources based on time information of user equipment;

releasing the SR resource if the user equipment has not received an uplink transmission resource when the SR counter reaches the preset maximum quantity of transmission times; and if the SR resource is released but preamble sending is not prohibited, performing the step: if the target request resource is the PRACH resource, sending a preamble to the base station by using the PRACH resource.

A second aspect of the embodiments of the present invention provides user equipment, including:

a receiving unit, configured to receive first configuration information sent by an base station;

an obtaining unit, configured to obtain request resources based on the first configuration information, where the request resources include an SR resource and a PRACH resource;

a determining unit, configured to determine a target request resource from the request resources based on time information of the user equipment, where the target request resource includes the SR resource or the PRACH resource; and a sending unit, configured to send an uplink resource request to the base station by using the target request resource.

In one embodiment, the obtaining unit is specifically configured to:

if learning, based on the first configuration information, that the request resources belong to a first-type cell, obtain the request resources from the first-type cell; or if learning, based on the first configuration information, that the PRACH resource belongs to a first-type cell and the SR resource belongs to a second-type cell, respectively obtain the request resources from the first-type cell and the second-type cell, where the first-type cell includes a cell in which CCA detection needs to be performed before to-be-transmitted data is sent, and the second-type cell includes a cell in which CCA detection does not need to be performed before to-be-transmitted data is sent.

In one embodiment, the determining unit includes:

a judgment subunit, configured to: if the SR resource in the request resources is obtained from the second-type cell, determine a priority of the to-be-transmitted data of the user equipment based on second configuration information received from the base station; and a determining subunit, configured to: if the to-be-transmitted data of the user equipment includes only first-priority data, determine, from the request resources based on the time information of the user equipment, that the target request resource is the SR resource, where the determining subunit is further configured to: if the to-be-transmitted data of the user equipment includes second-priority data, determine the target request resource from the request resources according to a time precedence principle and based on the time information of the user equipment.

In one embodiment, the determining unit is specifically configured to:

if the request resources are obtained from the first-type cell, determine the target request resource from the request resources according to a time precedence principle and based on the time information of the user equipment.

In one embodiment, the determining subunit is specifically configured to:

if the SR resource is selected from the request resources according to the time precedence principle and based on the time information of the user equipment, use the SR resource as the target request resource; or if the PRACH resource is selected from the request resources according to the time precedence principle and based on the time information of the user equipment, use the PRACH resource as the target request resource; or if both the SR resource and the PRACH resource are selected from the request resources according to the time precedence principle and based on the time information of the user equipment, determine the target request resource from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In one embodiment, the sending unit is specifically configured to:

if the target request resource is the SR resource, send an SR to the base station by using the SR resource; or if the target request resource is the PRACH resource, send a preamble to the base station by using the PRACH resource.

In one embodiment, the user equipment further includes a judgment unit;

the judgment unit is configured to: if the request resources are obtained from the first-type cell, determine whether a transmit channel of the target request is idle;

the sending unit is specifically configured to: if the transmit channel of the target request is idle, send the uplink resource request to the base station by using the target request resource; and the obtaining unit is specifically configured to: if the transmit channel of the target request is idle, determine a target request resource from the request resources based on the time information of the user equipment.

In one embodiment, the user equipment further includes a setting unit;

the setting unit is configured to: if downlink control information DCI sent by the base station is received, prolong receiving duration of a started window timer or start a window timer whose receiving duration is set; and the sending unit is specifically configured to: if no random access response RAR sent by the base station is received within the receiving duration, send the uplink resource request to the base station by using the target request resource.

In one embodiment, the user equipment further includes a first starting unit;

the first starting unit is configured to start a preamble prohibition timer; and the determining unit is configured to: if the user equipment has not received a contention success message when a preset timeout interval of the preamble prohibition timer expires, determine a target request resource from the request resources based on the time information of the user equipment.

In one embodiment, the user equipment further includes:
a second starting unit, configured to: if a preamble counter has not been started, start the preamble counter;
a first counting unit, configured to: if the preamble counter has been started, perform counting by using the preamble counter; and
a first prohibition unit, configured to prohibit preamble sending if the user equipment has not received a contention success message when the preamble counter reaches a preset maximum quantity of transmission times.

In one embodiment, the user equipment further includes a third starting unit, a fourth starting unit, a second counting unit, and a second prohibition unit;
the third starting unit is configured to start a preamble prohibition timer;
the fourth starting unit is configured to: if a preamble counter has not been started, start the preamble counter;
the second counting unit is configured to: if the preamble counter has been started, perform counting by using the preamble counter;
the determining unit is specifically configured to: if the user equipment has not received a contention success message when a preset timeout interval of the preamble prohibition timer expires and before the preamble counter reaches a preset maximum quantity of transmission times, determine a target request resource from the request resources based on the time information of the user equipment; and
the second prohibition unit is configured to prohibit preamble sending when the preamble counter reaches the preset maximum quantity of transmission times.

In one embodiment, the user equipment further includes a fifth starting unit;
the fifth starting unit is configured to start an SR prohibition timer; and
the determining unit is specifically configured to: if the user equipment has not received an uplink transmission resource when a preset timeout interval of the SR prohibition timer expires, determine a target request resource from the request resources based on the time information of the user equipment.

In one embodiment, the user equipment further includes a sixth starting unit and a third counting unit;
the sixth starting unit is configured to: if an SR counter has not been started, start the SR counter;
the third counting unit is configured to: if the SR counter has been started, perform counting by using the SR counter; and
the determining unit is specifically configured to: if the user equipment has not received an uplink transmission resource when the SR counter reaches a preset maximum quantity of transmission times, release the SR resource, and determine a target request resource from the request resources based on the time information of the user equipment.

In one embodiment, the user equipment further includes a seventh starting unit, an eighth starting unit, a fourth counting unit, and a releasing unit;
the seventh starting unit is configured to start an SR prohibition timer;

the eighth starting unit is configured to: if an SR counter has not been started, start the SR counter;
the fourth counting unit is configured to: if the SR counter has been started, perform counting by using the SR counter;
the determining unit is specifically configured to: if the user equipment has not received an uplink transmission resource when a preset timeout interval of the SR prohibition timer expires and before the SR counter reaches a preset maximum quantity of transmission times, determine a target request resource from the request resources based on the time information of the user equipment;
the releasing unit is configured to release the SR resource if the user equipment has not received an uplink transmission resource when the SR counter reaches the preset maximum quantity of transmission times; and
the sending unit is specifically configured to: if the SR resource is released but preamble sending is not prohibited, and if the target request resource is the PRACH resource, send a preamble to the base station by using the PRACH resource.

A third aspect of the embodiments of the present invention provides user equipment, where the user equipment includes an antenna, a processor, and a memory, the memory stores a group of programs, and the processor is configured to invoke the programs stored in the memory, so that the device performs the method according to any one of claims 1 to 14.

A fourth aspect of the embodiments of the present invention provides a computer storage medium, where the computer storage medium stores a program, and when the program is executed, the steps in any one of claims 1 to 14 are performed.

It may be learned from the foregoing descriptions that, in the embodiments of the present invention, after receiving the first configuration information sent by the base station, the user equipment may obtain the request resources based on the first configuration information, where the request resources include the SR resource and the PRACH resource; then determine the target request resource from the request resources based on the time information of the user equipment, where the target request resource includes the SR resource and/or the PRACH resource; and finally send the uplink resource request to the base station by using the target request resource. The SR resource and the PRACH resource are combined, and at least one resource is selected as the target request resource based on the cell time information, to send the uplink resource request to the base station. Therefore, a resource obtaining time can be shortened, and uplink transmission resource obtaining efficiency can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the invention objectives, features, and advantages of the present invention clearer and more comprehensible, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall belong to the protection scope of the present invention.

Figure 1:
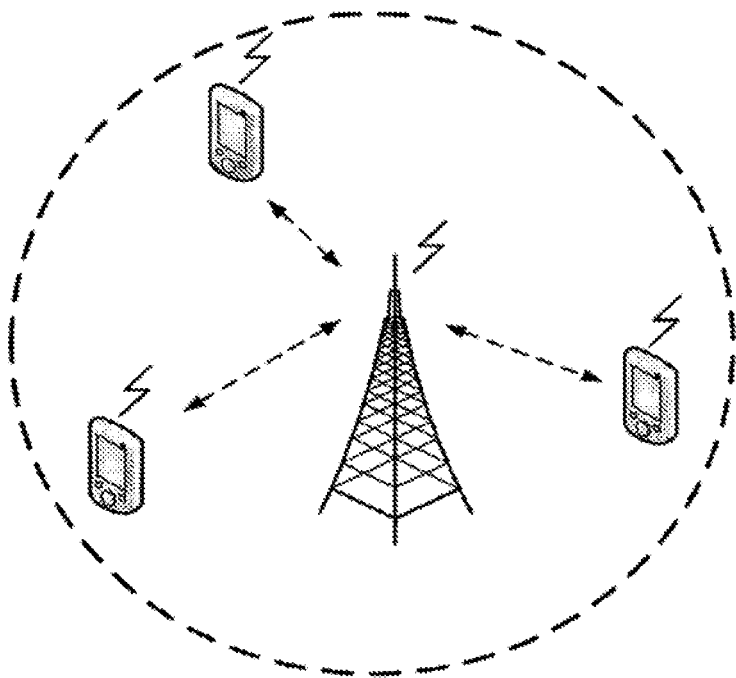
FIG. 1 is a schematic diagram of a network architecture in an LTE/LTE-A system according to an embodiment of the present invention.

To facilitate understanding of the embodiments of the present invention, the following first describes a schematic diagram of a network architecture in LTE/LTE-A in the embodiments of the present invention. Referring to FIG. 1, FIG. 1 is a schematic diagram of a network architecture in LTE/LTE-A according to an embodiment of the present invention. User equipment (UE) and a base station (such as an Evolved NodeB, eNB) are included in FIG. 1. The base station eNB can manage one or more cells. The UE may learn of an attribute of a cell that currently serves the UE, for example, a cell in which CCA detection needs to be performed, or a cell in which CCA detection does not need to be performed. In this embodiment of the present invention, the base station eNB may send SR resource configuration information to the UE, or send PRACH resource configuration information to the UE in a unicast or broadcast manner. The UE may obtain request resources by receiving first configuration information sent by the base station eNB. The request resources may include a time period, a frequency, a starting time, and other information, and may be classified into an SR resource and a PRACH resource. The user equipment may determine the SR resource and/or the PRACH resource as a target request resource, and send a target request to the base station using the target request resource, to obtain an uplink transmission resource. After receiving the uplink transmission resource, the UE can send data by using the uplink transmission resource. The uplink transmission resource is requested in a manner in which the SR resource and the PRACH resource coexist, so that a resource obtaining time can be shortened, and uplink transmission resource obtaining efficiency can be improved.

Figure 2:
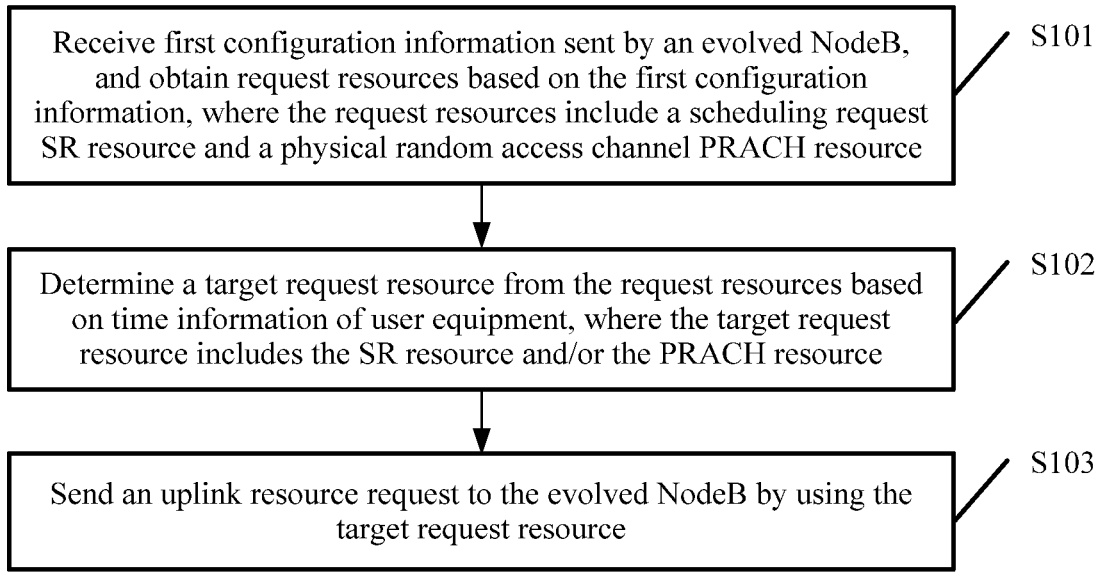
FIG. 2 is a schematic flowchart of a transmission resource obtaining method according to an embodiment of the present invention.

Referring to FIG. 2, FIG. 2 is a schematic flowchart of a transmission resource obtaining method according to an embodiment of the present invention. As shown in FIG. 2, the transmission resource obtaining method provided in this embodiment of the present invention may include operations S101 to S103.

Operation S101. Receive first configuration information sent by a base station, and obtain request resources based on the first configuration information, where the request resources include an SR resource and a PRACH resource.

Specifically, user equipment receives the first configuration information sent by the base station, and obtains the request resources based on the first configuration information. The request resources include the SR resource and the PRACH resource. When the user equipment obtains to-be-transmitted data, before sending the to-be-transmitted data, the user equipment needs to apply to the base station for an uplink transmission resource, so that the base station makes a scheduling decision after receiving the application, to determine whether to provide a corresponding service for the user equipment. Usually, when the base station has configured an SR resource for the user equipment, the user equipment may send an SR by using the SR resource, to apply to the base station for the uplink transmission resource. Alternatively, when the base station configures no SR request resource for the user equipment, the user equipment may perform a random access process to obtain a PRACH resource, and send a preamble by using the PRACH resource, to apply to the base station for the uplink transmission resource. This embodiment of the present invention may be applied to a cell in which CCA detection is performed. To obtain the uplink transmission resource as quickly as possible, the uplink transmission resource is applied for in a manner in which the base station configures both the SR resource and the PRACH resource for the user equipment. In this embodiment of the present invention, the first configuration information may include SR resource configuration information and/or PRACH resource configuration information. The base station may send the SR resource configuration information to the user equipment in a unicast manner, or may send, to the user equipment in a unicast or broadcast manner, the configuration information of the PRACH resource in the cell in which CCA detection is performed. The user equipment may obtain the request resources by receiving the first configuration information sent by the base station. The request resources may include a time period, a frequency, a starting time, and other information, and may be classified into the SR resource and the PRACH resource.

S102. Determine a target request resource from the request resources based on time information of user equipment, where the target request resource includes the SR resource and/or the PRACH resource.

In one embodiment, the user equipment determines the target request resource from the request resources based on the time information of the user equipment. The target request resource includes the SR resource and/or the PRACH resource. In this embodiment of the present invention, all the request resources, for example, the SR resource and/or the PRACH resource, obtained by the user equipment are periodical spectrum resources. The time information of the user equipment includes a current clock of the user equipment, and may further include the time period, the starting time, and other information that are configured by the base station. Information related to a subframe in which the user equipment is currently scheduled in the current clock may be determined based on the time information, and therefore a time location of the subframe in which the user equipment is currently scheduled may be obtained based on the time information of the user equipment. The target request resource may be determined from the request resources based on the time location of the current frame and a preset principle. For example, based on the SR resource and PRACH resource configuration information, subframes 2, 4, 6, 8, . . . in a timeline are the SR resource and subframes 3, 6, 9, . . . are the PRACH resource, and if a current moment of the user equipment is the subframe 3, the PRACH resource may be determined as the target request resource based on a time precedence principle; if the current moment of the user equipment is the subframe 6, both the SR resource and the PRACH resource meet the condition, and then it may be determined, based on a preset principle such as an "SR precedence" principle, that the target request resource is the SR resource, or the SR resource and the PRACH resource may be determined as the target request resource.

Operation S103. Send an uplink resource request to the base station by using the target request resource.

The user equipment sends the uplink resource request to the base station by using the target request resource. In this embodiment of the present invention, if the target request resource is the SR resource, an SR is sent to the base station by using the SR resource, to obtain the uplink transmission resource; or if the target request resource is the PRACH resource, a preamble is sent to the base station by using the PRACH resource, to perform a random access process to obtain the uplink transmission resource; or if the target request resource is the SR resource and the PRACH resource, an SR may be sent to the base station by using the SR resource, and a preamble may be sent to the base station by using the PRACH resource.

It may be learned from the foregoing descriptions that, in this embodiment of the present invention, after receiving the first configuration information sent by the base station, the user equipment may obtain the request resources based on the first configuration information, where the request resources include the SR resource and the PRACH resource; then determine the target request resource from the request resources based on the time information of the user equipment, where the target request resource includes the SR resource and/or the PRACH resource; and finally send the uplink resource request to the base station by using the target request resource. The SR resource and the PRACH resource are combined, and at least one resource is selected as the target request resource based on the cell time information, to send the uplink resource request to the base station. Therefore, a resource obtaining time can be shortened, and uplink transmission resource obtaining efficiency can be improved.

Figure 3:
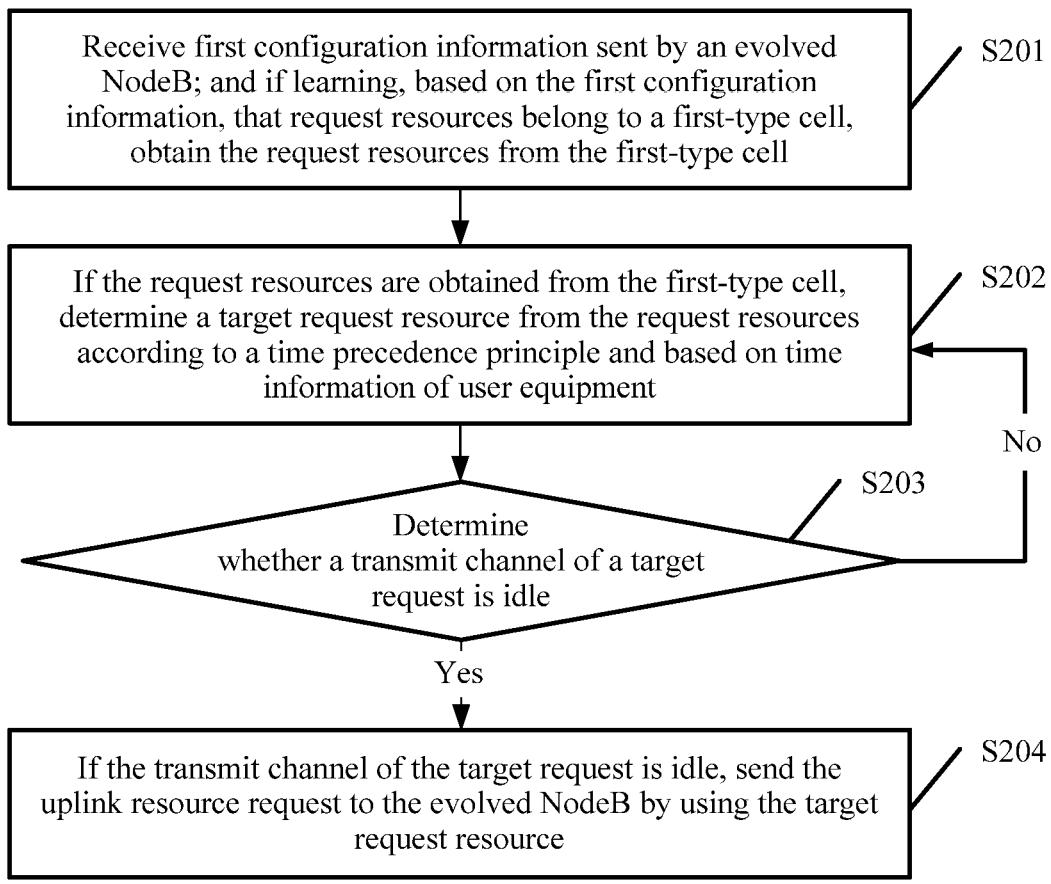
FIG. 3 is a schematic flowchart of another transmission resource obtaining method according to an embodiment of the present invention.

Referring to FIG. 3, FIG. 3 is a schematic flowchart of another transmission resource obtaining method according to an embodiment of the present invention. As shown in FIG. 3, the another transmission resource obtaining method provided in this embodiment of the present invention may include operations S201 to S204.

Operation S201. Receive first configuration information sent by a base station; and if learning, based on the first configuration information, that the request resources belong to a first-type cell, obtain the request resources from the first-type cell.

In one embodiment, user equipment receives the first configuration information sent by the base station; and if learning, based on the first configuration information, that the request resources belong to the first-type cell, obtains the request resources from the first-type cell. The first-type cell includes a cell in which CCA detection needs to be performed before to-be-transmitted data is sent. This embodiment of the present invention is applied to the cell in which CCA detection is performed, and the cell in which CCA detection is performed may be a licensed cell or an unlicensed cell. The base station may send SR resource configuration information to the user equipment in a unicast manner, or may send PRACH resource configuration information to the user equipment in a unicast or broadcast manner. The user equipment may obtain the request resources by receiving the first configuration information sent by the base station. The request resources may include a time period, a frequency, a starting time, and other information, and may be classified into an SR resource and a PRACH resource. The first configuration information may include the SR resource configuration information and/or the PRACH resource configuration information. If the user equipment receives the first configuration information sent by the base station, and learns, based on the first configuration information, that the request resources belong to the first-type cell, the user equipment may obtain the request resources from the first-type cell.

Operation S202. If the request resources are obtained from the first-type cell, determine a target request resource from the request resources according to a time precedence principle and based on time information of user equipment.

In one embodiment, if the request resources are obtained from the first-type cell, the user equipment determines the target request resource from the request resources according to the time precedence principle and based on the time information of the user equipment. In this embodiment of the present invention, the time information of the user equipment is a current clock of the user equipment, and may further include the time period, the starting time, and other information that are configured by the base station. A number of a subframe in which the user equipment is currently scheduled may be determined based on the time information. When the request resources are obtained from the first-type cell, that is, the cell in which CCA detection needs to be performed before to-be-transmitted data is sent, the target request resource may be determined from the request resources according to the time precedence principle and based on the time information of the user equipment. The time precedence principle means that a request resource that can be first obtained from a moment corresponding to a subframe that is in a resource configuration timeline and in which the user equipment is currently performing sending is determined as the target request resource based on the time information of the user equipment in the current user equipment. For example, if a current cell moment is a transmission moment in a frame 2, the SR resource is configured in a frame 3, and the PRACH resource is configured in a frame 4, the SR resource is determined as the target request resource based on the time precedence principle.

In one embodiment, if the SR resource is selected from the request resources according to the time precedence principle and based on the time information of the user equipment, the SR resource is used as the target request resource; or if the PRACH resource is selected from the request resources according to the time precedence principle and based on the time information of the user equipment, the PRACH resource is used as the target request resource; or if both the SR resource and the PRACH resource are selected from the request resources according to the time precedence principle and based on the time information of the user equipment, the target request resource is determined from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In one embodiment, if the first obtained request resource is the SR resource, the SR resource may be used as the target request resource. If the first obtained request resource is the PRACH resource, the PRACH resource may be used as the target request resource. If the first obtained request resource is the SR resource and the PRACH resource, the target request resource may be determined based on a configuration requirement pre-specified by the base station. If the configuration information is the configuration information indicating that the SR resource takes precedence, the SR resource may be determined as the target request resource. If the configuration information is the configuration information indicating that the PRACH resource takes precedence, or the configuration information indicating that the SR resource and the PRACH resource take precedence, the PRACH resource or the like may be correspondingly set as the target request resource. In this embodiment of the present invention, the request resource in the second-type cell may be determined as the target request resource based on the configuration information.

Operation S203. If the request resources are obtained from the first-type cell, determine whether a transmit channel of a target request is idle.

In one embodiment, if the request resources are obtained from the first-type cell, the user equipment determines whether the transmit channel of the target request is idle. If the request resources are obtained from the first-type cell, an LBT process needs to be completed before the target request is sent. If LBT is successful, the channel can be considered to be idle, and the target request is allowed to be sent. Otherwise, the channel is considered to be busy, and the target request is not allowed to be sent. In this embodiment of the present invention, the LBT process may be performed in the following manners. In a first manner, the LBT process is an LBT process in which no backoff is performed; to be specific, channel energy detection is greater than a threshold, no backoff is performed, and CCA detection continues until it is detected, through CCA detection, that the channel is idle. In a second manner, the LBT process is an LBT process in which backoff is performed; to be specific, channel energy detection is greater than a threshold, a backoff value such as X is randomly generated, and after it is detected, through CCA detection, that the backoff value X gradually decreases to 0, data can be sent when it is detected, through CCA detection, that the energy value is less than the preset threshold. In a third manner, the LBT process is an LBT process in which backoff is performed in a fixed window; to be specific, channel energy is greater than a preset threshold, and backoff is performed in a fixed backoff time window. In a fourth manner, the LBT process is an LBT process in which backoff is performed in a variable window; to be specific, channel energy detection is greater than a preset threshold, and backoff is performed in a variable backoff time window.

Operation S204. If the transmit channel of the target request is idle, send the uplink resource request to the base station by using the target request resource.

In one embodiment, if the transmit channel of the target request is idle, the user equipment sends the uplink resource request to the base station by using the target request resource. In this embodiment of the present invention, if the transmit channel of the target request is idle, it indicates that data can be currently sent on the transmit channel of the target request, and therefore the uplink resource request can be sent to the base station by using the target request resource.

In one embodiment, if the target request resource is the PRACH resource, the user equipment sends a preamble to the base station by using the PRACH resource.

Further optionally, the user equipment may start a preamble prohibition timer; and if the user equipment has not received a contention success message when a preset timeout interval of the preamble prohibition timer expires, perform the step of determining a target request resource from the request resources based on time information of user equipment.

In one embodiment, the preamble prohibition timer may be configured to: after the preamble is sent by using the PRACH resource, set a timing interval during which preamble sending is prohibited. If timing ends, the user equipment may continue preamble sending. The preamble prohibition timer may be immediately started after the preamble is sent by using the PRACH resource, or may be started after a preset delay, or may be immediately started after at least one time of preamble sending.

In one embodiment, if a preamble counter has not been started, the user equipment starts the preamble counter; or if the preamble counter has been started, the user equipment performs counting by using the preamble counter; and prohibits preamble sending if the user equipment has not received a contention success message when the preamble counter reaches a preset maximum quantity of transmission times.

In one embodiment, the preamble counter may be configured to collect statistics on a quantity of preamble transmission times. If the preamble counter has not been started, the preamble counter may be started. If the current preamble counter has been started, the preamble counter may perform counting in a manner in which the preamble counter automatically increases by 1 after each time of preamble transmission. Normal preamble transmission may be performed before the preamble counter reaches the maximum quantity of transmission times. Preamble sending is prohibited if the user equipment has not received a contention success message when the preamble counter reaches the preset maximum quantity of transmission times. Alternatively, preamble sending may be prohibited if the user equipment has not received a contention success message when the preamble counter exceeds the preset maximum quantity of transmission times, and an upper-layer protocol stack may be instructed to perform processing.

In one embodiment, the user equipment starts a preamble prohibition timer; and if a preamble counter has not been started, starts the preamble counter; or if the preamble counter has been started, the user equipment performs counting by using the preamble counter;

if the user equipment has not received a contention success message when a preset timeout interval of the preamble prohibition timer expires and before the preamble counter reaches a preset maximum quantity of transmission times, the user equipment performs the step of determining a target request resource from the request resources based on time information of user equipment; and the user equipment prohibits preamble sending when the preamble counter reaches the preset maximum quantity of transmission times.

In one embodiment, the user equipment may respectively control a preamble prohibition time and a quantity of preamble sending times by using the preamble prohibition timer and the preamble counter. For example, it may be specified that after the preamble is sent by using the PRACH resource, if the preamble counter is not started, the preamble prohibition timer is started, and preamble sending is prohibited in a preset time until the timeout interval expires. Alternatively, if the preamble counter has been started, the preamble counter may directly perform counting in a manner in which the preamble counter increases by 1 after each time of preamble transmission. If the user equipment has not received a contention success message when the preset timeout interval of the preamble prohibition timer expires and before the preamble counter reaches the preset maximum quantity of transmission times, the user equipment continues to perform the determining a target request resource from the request resources based on time information of user equipment. The contention success message includes an uplink transmission resource. If a quantity of preamble sending times that is obtained by using the preamble counter reaches the preset maximum quantity of transmission times, preamble sending is prohibited regardless of a status of the preamble prohibition timer. Alternatively, a preamble prohibition condition may be that the user equipment has not received a contention success message when a quantity of preamble sending times that is obtained by using the preamble counter exceeds the preset maximum quantity of transmission times. After preamble sending is prohibited, an upper-layer protocol stack may be instructed to perform processing.

In one embodiment, if the target request resource is the SR resource, the user equipment sends an SR to the base station by using the SR resource.

In one embodiment, the user equipment starts an SR prohibition timer; and if the user equipment has not received an uplink transmission resource when a preset timeout interval of the SR prohibition timer expires, performs the step of determining a target request resource from the request resources based on time information of user equipment.

In one embodiment, the SR prohibition timer may be configured to: after the SR is sent by using the SR resource, set a timing interval during which SR sending is prohibited. If timing ends, the user equipment may perform the step of determining a target request resource from the request resources based on time information of user equipment. The SR prohibition timer may be immediately started after the SR is sent by using the SR resource, or may be started after a preset delay, or may be immediately started after at least one time of preamble sending.

Optionally, in this embodiment of the present invention, a preamble prohibition timer may be immediately started after the SR is sent by using the SR resource, or may be started after a preset delay, or may be immediately started after at least one time of SR sending. In addition, the currently started preamble prohibition timer may be different from the previously started preamble prohibition timer. Alternatively, the previously started preamble prohibition timer may be restarted in the current situation.

In one embodiment, if an SR counter has not been started, the user equipment starts the SR counter; or if the SR counter has been started, performs counting by using the SR counter; and if the user equipment has not received an uplink transmission resource when the SR counter reaches a preset maximum quantity of transmission times, the user equipment releases the SR resource, and performs the step of determining a target request resource from the request resources based on time information of user equipment.

In one embodiment, the SR counter may be configured to collect statistics on a quantity of SR transmission times. If the SR counter has not been started, the SR counter may be started. If the SR counter has been started, the SR counter may be used to perform counting in a manner in which the SR counter increases by 1 after each time of SR transmission. Normal SR transmission may be performed before the SR counter reaches the maximum quantity of transmission times. If the user equipment has not received an uplink transmission resource when the SR counter reaches the preset maximum quantity of transmission times, the user equipment releases the SR resource, and performs the step of determining a target request resource from the request resources based on time information of user equipment. Alternatively, if the user equipment has not received an uplink transmission resource when the SR counter exceeds the preset maximum quantity of transmission times, the user equipment may release the SR resource, and perform the step of determining a target request resource from the request resources based on time information of user equipment.

In one embodiment, the user equipment starts an SR prohibition timer; if an SR counter has not been started, starts the SR counter; or if the SR counter has been started, may perform counting by using the SR counter; and if the user equipment has not received an uplink transmission resource when a preset timeout interval of the SR prohibition timer expires and before the SR counter reaches a preset maximum quantity of transmission times, performs the step of determining a target request resource from the request resources based on time information of user equipment;

the user equipment releases the SR resource if the user equipment has not received an uplink transmission resource when the SR counter reaches the preset maximum quantity of transmission times; and if the SR resource is released but preamble sending is not prohibited, the user equipment performs the step: if the target request resource is the PRACH resource, sending a preamble to the base station by using the PRACH resource.

In one embodiment, the user equipment may respectively control an SR prohibition time and a quantity of SR sending times by using the SR prohibition timer and the SR counter. For example, it may be specified that after the SR is sent by using the SR resource, the SR prohibition timer is started, and SR sending is prohibited in a preset time until the timeout interval expires. When the preset timeout interval of the SR prohibition timer expires, the SR counter may start to work. If the user equipment has not received an uplink transmission resource before the SR counter reaches the preset maximum quantity of transmission times, the user equipment continues to perform the step of determining a target request resource from the request resources based on time information of user equipment. If a quantity of SR sending times that is obtained by using the SR counter reaches the preset maximum quantity of transmission times, the SR resource is released regardless of a status of the SR prohibition timer. If preamble sending is not prohibited at this moment, the user equipment performs the step: if the target request resource is the PRACH resource, sending a preamble to the base station by using the PRACH resource. If preamble sending has been prohibited, the user equipment takes no action, or may instruct an upper-layer protocol stack to perform processing. Alternatively, a preamble prohibition condition may be that the user equipment has not received an uplink transmission resource when a quantity of preamble sending times that is obtained by using the preamble counter exceeds the preset maximum quantity of transmission times.

In one embodiment, if downlink control information (Downlink Control Information, DCI) sent by the base station is received, receiving duration of a started window timer is prolonged or a window timer whose receiving duration is set is started; and if no random access response (Random Access Response, RAR) sent by the base station is received within the receiving duration, the step of determining a target request resource from the request resources based on time information of user equipment is performed.

In one embodiment, the downlink control information DCI may be used as common indication information for a cell, and may be used to determine that the base station successfully obtains a channel resource. To avoid a waste of excessive resources required for sending the target request, the window timer is disposed in the user equipment, and may be configured to: after the preamble is sent by using the PRACH resource, time a preset time for receiving a message indicating that the base station successfully allocates the channel resource. The window timer whose receiving duration is set may be started, or the receiving duration of the window timer may be prolonged based on an actual requirement. If no random access response RAR sent by the base station is received within the receiving duration, it indicates that the channel resource fails to be transmitted, and then the step of determining a target request resource from the request resources based on time information of user equipment may be performed again. For example, after the preamble is sent by using the PRACH resource, when the receiving duration of the window timer is set to 5 s, if no RAR is received after 5 s, the target request resource may be determined from the request resources based on the time information of the user equipment. In this case, the target request resource may be a PRACH resource different from the previous PRACH resource in time domain, or may be an SR resource different from the previous SR resource in time domain. Preferably, the RAR is sent by using the first-type cell. If the downlink control information DCI sent by the base station is received, it may be determined that the first-type cell has successfully obtained the channel resource.

In one embodiment, if the transmit channel of the target request is not idle, the step of determining a target request resource from the request resources based on time information of user equipment is performed.

In one embodiment, if the transmit channel of the target request is not idle, the user equipment performs the step of determining a target request resource from the request resources based on time information of user equipment. In this embodiment of the present invention, if the transmit channel is not idle, it indicates that data cannot be currently sent on the channel, and the user equipment needs to determine a new target request resource from the request resources based on the time information of the user equipment.

It may be learned that in this embodiment of the present invention, if the user equipment receives the first configuration information sent by the base station, and learns, based on the first configuration information, that the request resources belong to the first-type cell, the user equipment obtains the request resources from the first-type cell. The first-type cell includes the cell in which CCA detection needs to be performed before to-be-transmitted data is sent. The user equipment may determine the target request resource from the request resources according to the time precedence principle and based on the time information of the user equipment, and determine whether the transmit channel of the target request is idle. Then, if the transmit channel is idle, the user equipment sends the uplink resource request to the base station by using the target request resource. In this embodiment of the present invention, the uplink transmission resource is obtained when the transmission resource belongs to the first-type cell, and the target request resource is determined based on the time precedence principle, so that uplink transmission resource obtaining efficiency is improved more effectively.

Figure 4:
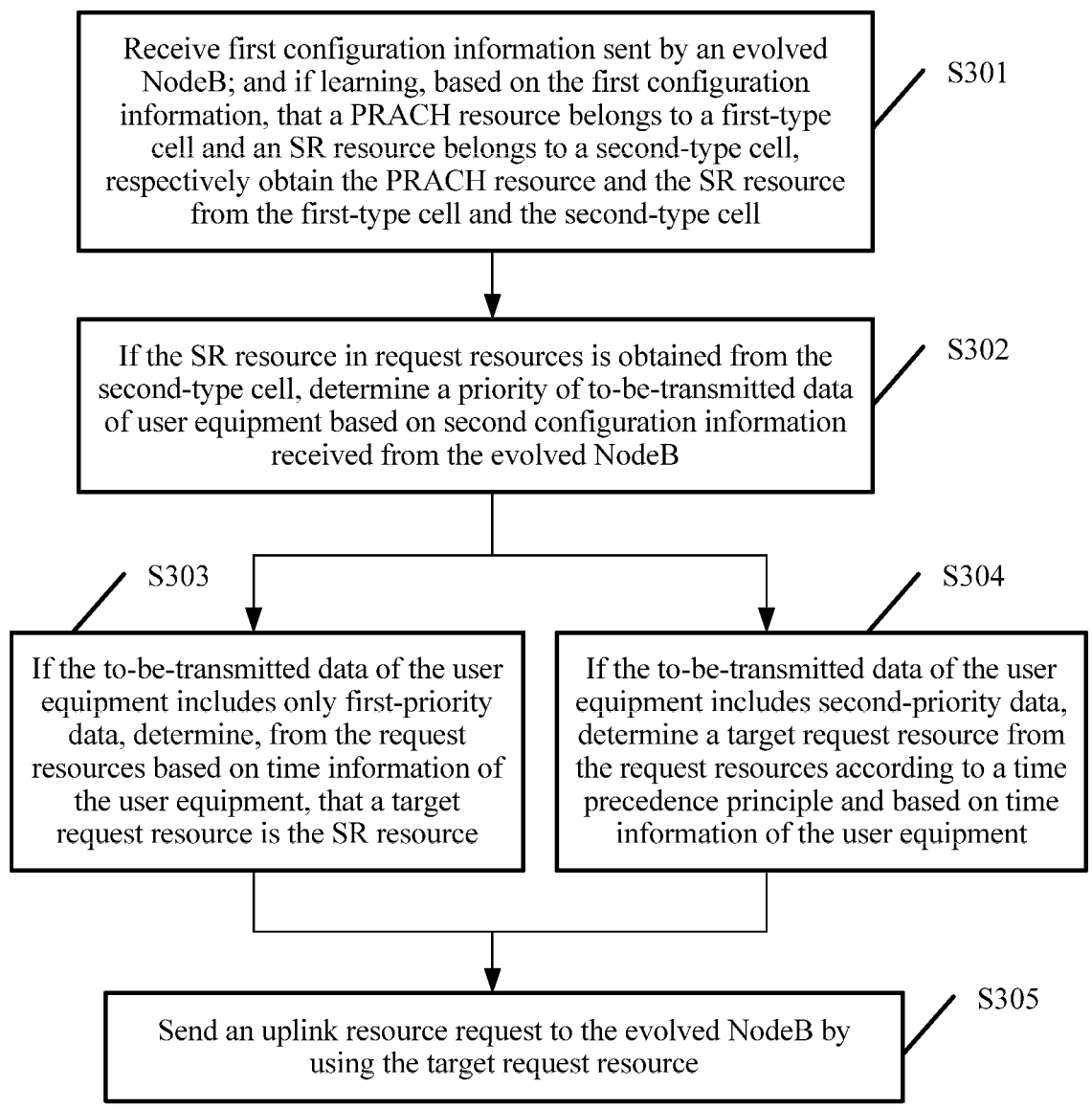
FIG. 4 is a schematic flowchart of still another transmission resource obtaining method according to an embodiment of the present invention.

Referring to FIG. 4, FIG. 4 is a schematic flowchart of still another transmission resource obtaining method according to an embodiment of the present invention. As shown in FIG. 4, the still another transmission resource obtaining method provided in this embodiment of the present invention may include operations S301 to S305.

Operation S301. Receive first configuration information sent by an base station; and if learning, based on the first configuration information, that the PRACH resource belongs to a first-type cell and an SR resource belongs to a second-type cell, respectively obtain the PRACH resource and the SR resource from the first-type cell and the second-type cell.

In one embodiment, user equipment receives the first configuration information sent by the base station; and if learning, based on the first configuration information, that the PRACH resource belongs to the first-type cell and the SR resource belongs to the second-type cell, the user equipment may respectively obtain the PRACH resource and the SR resource from the first-type cell and the second-type cell. The first-type cell includes a cell in which CCA detection needs to be performed before to-be-transmitted data is sent, and the second-type cell includes a cell in which CCA detection does not need to be performed before to-be-transmitted data is sent. When the user equipment obtains to-be-transmitted data, before sending the to-be-transmitted data, the user equipment needs to apply to the base station for an uplink transmission resource, so that the base station makes a scheduling decision after receiving the application, to determine whether to provide a corresponding service for the user equipment. In this embodiment of the present invention, based on the first configuration information of the base station, the user equipment may obtain the SR resource from the second-type cell, and send an SR to the base station by using the SR resource, to apply to the base station for the uplink transmission resource; or the user equipment may obtain the PRACH resource from the first-type cell, and send a preamble by using the PRACH resource, to apply to the base station for the uplink transmission resource. In this embodiment of the present invention, to obtain the uplink transmission resource as quickly as possible, the base station configures both the SR resource and the PRACH resource for the user equipment, so as to help the user equipment apply for the uplink transmission resource. The base station may send SR resource configuration information to the user equipment in a unicast manner, or may send PRACH resource configuration information to the user equipment in a unicast or broadcast manner. The user equipment may obtain request resources by receiving the first configuration information sent by the base station. The first configuration information may include the SR resource configuration information and/or the PRACH resource configuration information. The request resources may include a time period, a frequency, a starting time, and other information, and may be classified into the SR resource and the PRACH resource.

Operation S302. If the SR resource in the request resources is obtained from the second-type cell, determine a priority of the to-be-transmitted data of the user equipment based on second configuration information received from the base station.

Specifically, if the SR resource in the request resources is obtained from the second-type cell, the user equipment determines the priority of the to-be-transmitted data of the user equipment based on the second configuration information received from the base station. The second configuration information includes a priority that is of the to-be-transmitted data and that is specified by the base station, and priority mapping may be performed on the to-be-transmitted data of the user equipment based on the second configuration information. Priorities may be classified into a first priority and a second priority, which are respectively corresponding to a high priority and a low priority. This may be set by the base station based on quality of service (Quality of Service, QoS). In this embodiment of the present invention, the priorities are not limited to the foregoing two priorities, and may further include a possible third priority, fourth priority, and the like.

Operation S303. If the to-be-transmitted data of the user equipment includes only first-priority data, determine, from the request resources based on time information of the user equipment, that the target request resource is the SR resource.

In one embodiment, if the to-be-transmitted data of the user equipment includes only the first-priority data, the user equipment determines, from the request resources based on the time information of the user equipment, that the target request resource is the SR resource. In this embodiment of the present invention, all the request resources, for example, the SR resource or the PRACH resource, obtained by the user equipment are periodical spectrum resources. The time information of the user equipment is a current clock of the user equipment, and may further include the time period, the starting time, and other information that are configured by the base station. A number of a subframe in which the user equipment is currently scheduled, for example, a subframe in which the user equipment is scheduled at a current moment, may be determined based on the time information. A time location of the subframe in which the user equipment is currently scheduled may be obtained based on the cell time information, and the target request resource may be determined from the request resources based on the time location of the current subframe and a preset principle. If the to-be-transmitted data of the user equipment includes only the first-priority data, namely, high-priority data, it may be directly determined that the target request resource is the SR resource, and the target PRACH resource cannot be used as the target request resource.

Operation S304. If the to-be-transmitted data of the user equipment includes second-priority data, determine a target request resource from the request resources according to a time precedence principle and based on time information of the user equipment.

In one embodiment, if the to-be-transmitted data of the user equipment includes the second-priority data, the target request resource is determined from the request resources according to the time precedence principle and based on the time information of the user equipment. In this embodiment of the present invention, there may be two cases in which the to-be-transmitted data of the user equipment includes the second-priority data. In a first case, the to-be-transmitted data includes only the second-priority data. In a second case, the to-be-transmitted data includes the first-priority data and the second-priority data. In either of the cases, the target request resource may be determined from the request resources according to the time precedence principle and based on the time information of the user equipment, namely, "first-come first-used". The time precedence principle means that a request resource that can be first obtained from a moment corresponding to a subframe that is in a resource configuration timeline and in which the user equipment is currently performing sending is determined as the target request resource based on the time information of the user equipment in the current user equipment.

In one embodiment, if the SR resource is selected from the request resources according to the time precedence principle and based on the time information of the user equipment, the SR resource is used as the target request resource; or if the PRACH resource is selected from the request resources according to the time precedence principle and based on the time information of the user equipment, the PRACH resource is used as the target request resource; or if both the SR resource and the PRACH resource are selected from the request resources according to the time precedence principle and based on the time information of the user equipment, the target request resource is determined from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In one embodiment, if the first obtained request resource is the SR resource, the SR resource may be used as the target request resource. If the first obtained request resource is the PRACH resource, the PRACH resource may be used as the target request resource. If the first obtained request resource is the SR resource and the PRACH resource, the target request resource may be determined based on a configuration requirement pre-specified by the base station. If the configuration information is the configuration information indicating that the SR resource takes precedence, the SR resource may be determined as the target request resource. If the configuration information is the configuration information indicating that the PRACH resource takes precedence, or the configuration information indicating that the SR resource and the PRACH resource take precedence, the PRACH resource or the like may be correspondingly set as the target request resource. In this embodiment of the present invention, the request resource in the second-type cell may be determined as the target request resource based on the configuration information.

Operation S305. Send an uplink resource request to the base station by using the target request resource.

In one embodiment, if the target request resource is the PRACH resource, a preamble is sent to the base station by using the PRACH resource.

In one embodiment, the user equipment may start a preamble prohibition timer; and if the user equipment has not received a contention success message when a preset timeout interval of the preamble prohibition timer expires, perform the step of determining a target request resource from the request resources based on time information of user equipment.

In one embodiment, if a preamble counter has not been started, the user equipment starts the preamble counter; or if the preamble counter has been started, the user equipment performs counting by using the preamble counter; and the user equipment prohibits preamble sending if the user equipment has not received a contention success message when the preamble counter reaches a preset maximum quantity of transmission times.

In one embodiment, the user equipment starts a preamble prohibition timer; and if a preamble counter has not been started, starts the preamble counter; or if the preamble counter has been started, the user equipment performs counting by using the preamble counter;

if the user equipment has not received a contention success message when a preset timeout interval of the preamble prohibition timer expires and before the preamble counter reaches a preset maximum quantity of transmission times, the user equipment performs the step of determining a target request resource from the request resources based on time information of user equipment; and the user equipment prohibits preamble sending when the preamble counter reaches the preset maximum quantity of transmission times.

In one embodiment, if the target request resource is the SR resource, an SR is sent to the base station by using the SR resource.

In one embodiment, the user equipment starts an SR prohibition timer; and if the user equipment has not received an uplink transmission resource when a preset timeout interval of the SR prohibition timer expires, performs the step of determining a target request resource from the request resources based on time information of user equipment.

In one embodiment, if an SR counter has not been started, the user equipment starts the SR counter; or if the SR counter has been started, performs counting by using the SR counter;

if the user equipment has not received an uplink transmission resource when the SR counter reaches a preset maximum quantity of transmission times, the user equipment releases the SR resource, and performs the step of determining a target request resource from the request resources based on time information of user equipment.

In one embodiment, the user equipment starts an SR prohibition timer; if an SR counter has not been started, starts the SR counter; and if the SR counter has been started, performs counting by using the SR counter;

if the user equipment has not received an uplink transmission resource when a preset timeout interval of the SR prohibition timer expires and before the SR counter reaches a preset maximum quantity of transmission times, the user equipment performs the step of determining a target request resource from the request resources based on time information of user equipment;

the user equipment releases the SR resource if the user equipment has not received an uplink transmission resource when the SR counter reaches the preset maximum quantity of transmission times; and if the SR resource is released but preamble sending is not prohibited, the user equipment performs the step: if the target request resource is the PRACH resource, sending a preamble to the base station by using the PRACH resource.

In one embodiment, if downlink control information DCI sent by the base station is received, receiving duration of a started window timer is prolonged or a window timer whose receiving duration is set is started; and if no random access response RAR sent by the base station is received within the receiving duration, the step of sending an uplink resource request to the base station by using the target request resource is performed.

For detailed descriptions of the foregoing steps, refer to the method embodiment corresponding to FIG. 3.

It may be learned that in this embodiment of the present invention, if the first configuration information sent by the base station is received, and it is learned, based on the first configuration information, that the PRACH resource belongs to the first-type cell and the SR resource belongs to the second-type cell, the PRACH resource and the SR resource are respectively obtained from the first-type cell and the second-type cell. If the SR resource in the request resources is obtained from the second-type cell, the priority of the to-be-transmitted data of the user equipment is determined based on the second configuration information received from the base station. If the to-be-transmitted data of the user equipment includes only the first-priority data, it is determined, from the request resources based on the time information of the user equipment, that the target request resource is the SR resource. If the to-be-transmitted data of the user equipment includes the second-priority data, the target request resource is determined from the request resources according to the time precedence principle and based on the time information of the user equipment, and the uplink resource request is sent to the base station by using the target request resource. In this embodiment of the present invention, uplink channel transmission is obtained when the PRACH resource belongs to the first-type cell and the SR resource belongs to the second-type cell, target request data is determined based on a result of determining the priority of the to-be-transmitted data and the time precedence principle. Therefore, the user equipment can obtain the uplink transmission resource as quickly as possible.

Figure 5:
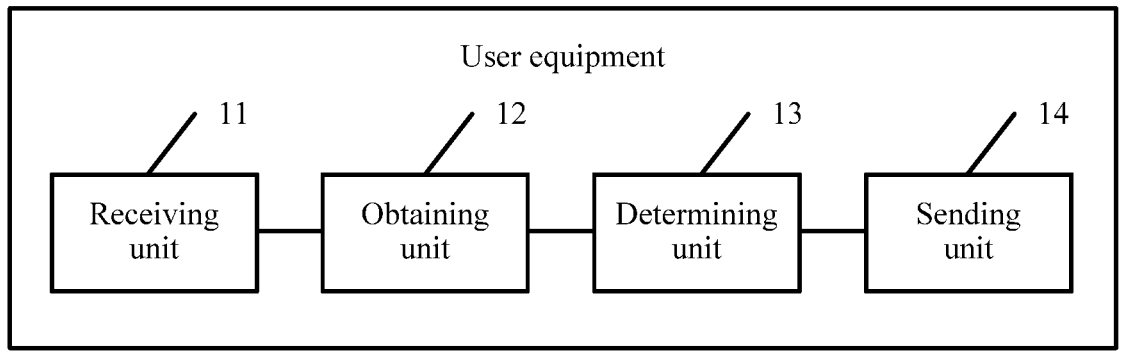
FIG. 5 is a schematic modular diagram of user equipment according to an embodiment of the present invention.

Referring to FIG. 5, FIG. 5 is a schematic modular diagram of user equipment according to an embodiment of the present invention. As shown in FIG. 5, the user equipment may include a receiving unit 11, an obtaining unit 12, a determining unit 13, and a sending unit 14.

The receiving unit 11 is configured to receive first configuration information sent by an base station.

The obtaining unit 12 is configured to obtain request resources based on the first configuration information, where the request resources include an SR resource and a PRACH resource.

In one embodiment, the receiving unit 11 receives the first configuration information sent by the base station, and the obtaining unit 12 obtains the request resources based on the first configuration information. The request resources include the SR resource and the PRACH resource. When the user equipment obtains to-be-transmitted data, before sending the to-be-transmitted data, the user equipment needs to apply to the base station for an uplink transmission resource, so that the base station makes a scheduling decision after receiving the application, to determine whether to provide a corresponding service for the user equipment. Usually, when the base station has configured an SR resource for the user equipment, the user equipment may send an SR by using the SR resource, to apply to the base station for the uplink transmission resource. Alternatively, when the base station configures no request resource for the user equipment, the user equipment may perform a random access process to obtain a PRACH resource, and send a preamble by using the PRACH resource, to apply to the base station for the uplink transmission resource. This embodiment of the present invention may be applied to a cell in which CCA detection is performed. To obtain the uplink transmission resource as quickly as possible, the uplink transmission resource is applied for in a manner in which the base station configures both the SR resource and the PRACH resource for the user equipment. In this embodiment of the present invention, the first configuration information may include SR resource configuration information and/or PRACH resource configuration information. The base station may send the SR resource configuration information to the user equipment in a unicast manner, or may send, to the user equipment in a unicast or broadcast manner, the configuration information of the PRACH resource in the cell in which CCA detection is performed. The receiving unit 11 may receive the first configuration information sent by the base station, and the obtaining unit 12 obtains the request resources. The request resources may include a time period, a frequency, a starting time, and other information, and may be classified into the SR resource and the PRACH resource.

The determining unit 13 is configured to determine a target request resource from the request resources based on time information of the user equipment, where the target request resource includes the SR resource or the PRACH resource.

In one embodiment, the determining unit 13 determines the target request resource from the request resources based on the time information of the user equipment. The target request resource includes the SR resource or the PRACH resource. In this embodiment of the present invention, all the request resources, for example, the SR resource or the PRACH resource, obtained by the user equipment are periodical spectrum resources. The time information of the user equipment includes a current clock of the user equipment, and may further include the time period, the starting time, and other information that are configured by the base station. Information related to a subframe in which the user equipment is currently scheduled in the current clock may be determined based on the time information, and therefore a time location of the subframe in which the user equipment is currently scheduled may be obtained based on the time information of the user equipment. The target request resource is determined from the request resources based on the time location of the current frame and a preset principle. For example, based on the SR resource and PRACH resource configuration information, subframes 2, 4, 6, 8, . . . in a timeline are the SR resource and subframes 3, 6, 9, . . . are the PRACH resource, and if a current moment of the user equipment is the subframe 3, the PRACH resource may be determined as the target request resource based on a time precedence principle; if the current moment of the user equipment is the subframe 6, both the SR resource and the PRACH resource meet the condition, and then it may be determined, based on a preset principle such as an "SR precedence" principle, that the target request resource is the SR resource, or the SR resource and the PRACH resource may be determined as the target request resource.

The sending unit 14 is configured to send an uplink resource request to the base station by using the target request resource.

The sending unit 14 sends the uplink resource request to the base station by using the target request resource. In this embodiment of the present invention, if the target request resource is the SR resource, an SR is sent to the base station by using the SR resource, to obtain the uplink transmission resource; or if the target request resource is the PRACH resource, a preamble is sent to the base station by using the PRACH resource, to perform a random access process to obtain the uplink transmission resource; or if the target request resource is the SR resource and the PRACH resource, an SR may be sent to the base station by using the SR resource, and a preamble may be sent to the base station by using the PRACH resource.

It may be learned from the foregoing descriptions that, in this embodiment of the present invention, after receiving the first configuration information sent by the base station, the user equipment may obtain the request resources based on the first configuration information, where the request resources include the SR resource and the PRACH resource; then determine the target request resource from the request resources based on the time information of the user equipment, where the target request resource includes the SR resource and/or the PRACH resource; and finally send the uplink resource request to the base station by using the target request resource. The SR resource and the PRACH resource are combined, and at least one resource is selected as the target request resource based on the cell time information, to send the uplink resource request to the base station. Therefore, a resource obtaining time can be shortened, and uplink transmission resource obtaining efficiency can be improved.

Figure 6:
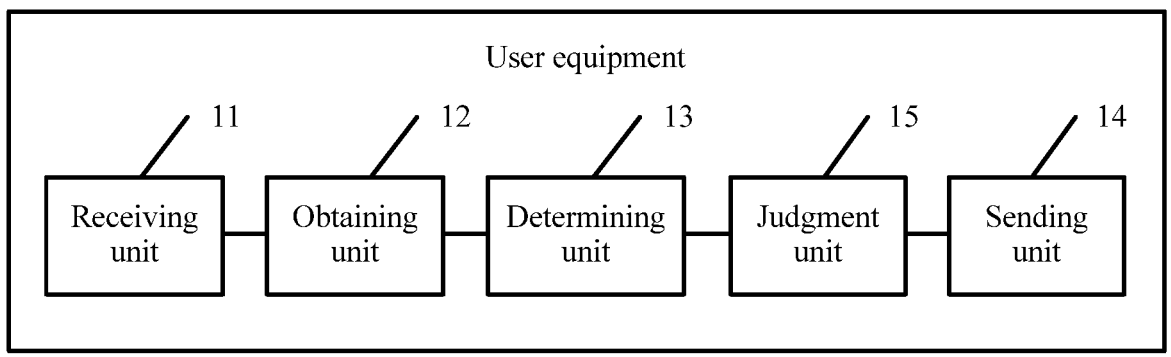
FIG. 6 is a schematic modular diagram of another user equipment according to an embodiment of the present invention.

Referring to FIG. 6, FIG. 6 is a schematic modular diagram of user equipment according to an embodiment of the present invention. As shown in FIG. 6, the user equipment may include a receiving unit 11, an obtaining unit 12, a determining unit 13, a sending unit 14, and a judgment unit 15.

The receiving unit 11 is configured to receive first configuration information sent by an base station.

The obtaining unit 12 is configured to: if learning, based on the first configuration information, that the request resources belong to a first-type cell, obtain the request resources from the first-type cell.

In one embodiment, the receiving unit 11 receives the first configuration information sent by the base station; and if the obtaining unit 12 learns, based on the first configuration information, that the request resources belong to the first-type cell, the obtaining unit 12 obtains the request resources from the first-type cell. The first-type cell includes a cell in which CCA detection needs to be performed before to-be-transmitted data is sent. This embodiment of the present invention is applied to the cell in which CCA detection is performed, and the cell in which CCA detection is performed may be a licensed cell or an unlicensed cell. The base station may send SR resource configuration information to the user equipment in a unicast manner, or may send PRACH resource configuration information to the user equipment in a unicast or broadcast manner. The user equipment may obtain the request resources by receiving the first configuration information sent by the base station. The request resources may include a time period, a frequency, a starting time, and other information, and may be classified into an SR resource and a PRACH resource. In addition to the SR resource configuration information and the PRACH resource configuration information, the first configuration information may include time information of the cell to which the request resources belong. If the user equipment receives the first configuration information sent by the base station, and learns, based on the first configuration information, that the request resources belong to the first-type cell, the user equipment may obtain the request resources from the first-type cell by using the obtaining unit 12.

The determining unit 13 is configured to: if the request resources are obtained from the first-type cell, determine a target request resource from the request resources according to a time precedence principle and based on the time information of the user equipment.

In one embodiment, if the request resources are obtained from the first-type cell, the determining unit 13 determines the target request resource from the request resources according to the time precedence principle and based on the time information of the user equipment. In this embodiment of the present invention, the time information of the user equipment is a current clock of the user equipment, and may further include the time period, the starting time, and other information that are configured by the base station. A number of a subframe in which the user equipment is currently scheduled may be determined based on the time information. When the request resources are obtained from the first-type cell, that is, the cell in which CCA detection needs to be performed before to-be-transmitted data is sent, the determining unit 13 may determine the target request resource from the request resources according to the time precedence principle and based on the time information of the user equipment. The time precedence principle means that a request resource that can be first obtained from a moment corresponding to a subframe that is in a resource configuration timeline and in which the user equipment is currently performing sending is determined as the target request resource based on the time information of the user equipment in the current user equipment. For example, if a current cell moment is a transmission moment in a frame 2, the SR resource is configured in a frame 3, and the PRACH resource is configured in a frame 4, the SR resource is determined as the target request resource based on the time precedence principle.

In one embodiment, the determining unit 13 is specifically configured to: if the SR resource is selected from the request resources according to the time precedence principle and based on the time information of the user equipment, use the SR resource as the target request resource; or if the PRACH resource is selected from the request resources according to the time precedence principle and based on the time information of the user equipment, use the PRACH resource as the target request resource; or if both the SR resource and the PRACH resource are selected from the request resources according to the time precedence principle and based on the time information of the user equipment, determine the target request resource from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In one embodiment, if the first obtained request resource is the SR resource, the determining unit 13 may use the SR resource as the target request resource. If the first obtained request resource is the PRACH resource, the PRACH resource may be used as the target request resource. If the first obtained request resource is the SR resource and the PRACH resource, the determining unit 13 may determine the target request resource based on a configuration requirement pre-specified by the base station. If the configuration information is the configuration information indicating that the SR resource takes precedence, the SR resource may be determined as the target request resource. If the configuration information is the configuration information indicating that the PRACH resource takes precedence, or the configuration information indicating that the SR resource and the PRACH resource take precedence, the PRACH resource or the like may be correspondingly set as the target request resource. In this embodiment of the present invention, the request resource in the second-type cell may be determined as the target request resource based on the configuration information.

The judgment unit 15 is configured to: if the request resources are obtained from the first-type cell, determine whether a transmit channel of a target request is idle.

In one embodiment, if the request resources are obtained from the first-type cell, the judgment unit 15 determines whether the transmit channel of the target request is idle. If the request resources are obtained from the first-type cell, an LBT process needs to be completed before the target request is sent. If LBT is successful, the channel can be considered to be idle, and the target request is allowed to be sent. Otherwise, the channel is considered to be busy, and the target request is not allowed to be sent. In this embodiment of the present invention, the LBT process may be performed in the following manners. In a first manner, the LBT process is an LBT process in which no backoff is performed; to be specific, channel energy detection is greater than a threshold, no backoff is performed, and CCA detection continues until it is detected, through CCA detection, that the channel is idle. In a second manner, the LBT process is an LBT process in which backoff is performed; to be specific, channel energy detection is greater than a threshold, a backoff value such as X is randomly generated, and after it is detected, through CCA detection, that the backoff value X gradually decreases to 0, data can be sent when it is detected, through CCA detection, that the energy value is less than the preset threshold. In a third manner, the LBT process is an LBT process in which backoff is performed in a fixed window; to be specific, channel energy is greater than a preset threshold, and backoff is performed in a fixed backoff time window. In a fourth manner, the LBT process is an LBT process in which backoff is performed in a variable window; to be specific, channel energy detection is greater than a preset threshold, and backoff is performed in a variable backoff time window.

The sending unit 14 is configured to: if the transmit channel of the target request is idle, send the uplink resource request to the base station by using the target request resource.

In one embodiment, if the transmit channel of the target request of the user equipment is idle, the sending unit 14 sends the uplink resource request to the base station by using the target request resource. In this embodiment of the present invention, if the transmit channel of the target request is idle, it indicates that data can be currently sent on the transmit channel of the target request, and therefore the sending unit 14 can send the uplink resource request to the base station by using the target request resource.

In one embodiment, if the target request resource is the PRACH resource, the sending unit 14 sends a preamble to the base station by using the PRACH resource.

In one embodiment, a first starting unit may start a preamble prohibition timer; and if the user equipment has not received a contention success message when a preset timeout interval of the preamble prohibition timer expires, the determining unit 13 may determine a target request resource from the request resources based on the time information of the user equipment.

In one embodiment, the preamble prohibition timer may be configured to: after the preamble is sent by using the PRACH resource, set a timing interval during which preamble sending is prohibited. If timing ends, the sending unit 14 may continue preamble sending. The preamble prohibition timer may be immediately started after the preamble is sent by using the PRACH resource, or may be started after a preset delay, or may be immediately started after at least one time of preamble sending.

In one embodiment, if a preamble counter has not been started, a second starting unit starts the preamble counter; or if the preamble counter has been started, counting is performed by using the preamble counter; and a first prohibition unit prohibits preamble sending if the user equipment has not received a contention success message when the preamble counter reaches a preset maximum quantity of transmission times.

In one embodiment, the preamble counter may be configured to collect statistics on a quantity of preamble transmission times. If the preamble counter is not started, the second starting unit may start the preamble counter. If the current preamble counter has been started, the preamble counter may perform counting in a manner in which the preamble counter automatically increases by 1 after each time of preamble transmission. Normal preamble transmission may be performed before the preamble counter reaches the maximum quantity of transmission times. The first prohibition unit prohibits preamble sending if the user equipment has not received a contention success message when the preamble counter reaches the preset maximum quantity of transmission times. Alternatively, the first prohibition unit may prohibit preamble sending if the user equipment has not received a contention success message when the preamble counter exceeds the preset maximum quantity of transmission times, and may instruct an upper-layer protocol stack to perform processing.

In one embodiment, a third starting unit starts a preamble prohibition timer; and if a preamble counter has not been started, a fourth starting unit starts the preamble counter; or if the preamble counter has been started, counting is performed by using the preamble counter;

if the user equipment has not received a contention success message when a preset timeout interval of the preamble prohibition timer expires and before the preamble counter reaches a preset maximum quantity of transmission times, the determining unit 13 determines a target request resource from the request resources based on the time information of the user equipment; and a second prohibition unit prohibits preamble sending when the preamble counter reaches the preset maximum quantity of transmission times.

In one embodiment, the user equipment may respectively control a preamble prohibition time and a quantity of preamble sending times by using the preamble prohibition timer and the preamble counter. For example, it may be specified that after the preamble is sent by using the PRACH resource, if the preamble counter is not started, the third starting unit starts the preamble prohibition timer, and preamble sending is prohibited in a preset time until the timeout interval expires. Alternatively, if the preamble counter has been started, the preamble counter may directly perform counting in a manner in which the preamble counter increases by 1 after each time of preamble transmission. If the user equipment has not received a contention success message when the preset timeout interval of the preamble prohibition timer expires and before the preamble counter reaches the preset maximum quantity of transmission times, the determining unit 13 may determine the target request resource from the request resources based on the time information of the user equipment. The contention success message includes an uplink transmission resource. If a quantity of preamble sending times that is obtained by using the preamble counter reaches the preset maximum quantity of transmission times, preamble sending is prohibited regardless of a status of the preamble prohibition timer. Alternatively, a preamble prohibition condition may be that the user equipment has not received a contention success message when a quantity of preamble sending times that is obtained by using the preamble counter exceeds the preset maximum quantity of transmission times. After prohibiting preamble sending, the second prohibition unit may instruct an upper-layer protocol stack to perform processing.

In one embodiment, if the target request resource is the SR resource, the sending unit 14 may send an SR to the base station by using the SR resource.

In one embodiment, a fifth starting unit is configured to start an SR prohibition timer; and if the user equipment has not received an uplink transmission resource when a preset timeout interval of the SR prohibition timer expires, the determining unit 13 may determine a target request resource from the request resources based on the time information of the user equipment.

In one embodiment, the SR prohibition timer may be configured to: after the SR is sent by using the SR resource, set a timing interval during which SR sending is prohibited. If timing ends, the determining unit 13 may determine the target request resource from the request resources based on the time information of the user equipment. The SR prohibition timer may be immediately started after the SR is sent by using the SR resource, or may be started after a preset delay.

Optionally, in this embodiment of the present invention, a preamble prohibition timer may be immediately started after the SR is sent by using the SR resource, or may be started after a preset delay, or may be immediately started after at least one time of SR sending. In addition, the currently started preamble prohibition timer may be different from the previously started preamble prohibition timer. Alternatively, the previously started preamble prohibition timer may be restarted in the current situation.

In one embodiment, if an SR counter has not been started, a sixth starting unit starts the SR counter; or if the SR counter has been started, counting is performed by using the SR counter; and if the user equipment has not received an uplink transmission resource when the SR counter reaches a preset maximum quantity of transmission times, the releasing unit may release the SR resource, and the determining unit 13 determines a target request resource from the request resources based on the time information of the user equipment.

In one embodiment, the SR counter may be configured to collect statistics on a quantity of SR transmission times. If the SR counter has not been started, the sixth starting unit may start the SR counter. If the SR counter has been started, the SR counter may be used to perform counting in a manner in which the SR counter increases by 1 after each time of SR transmission. Normal SR transmission may be performed before the SR counter reaches the maximum quantity of transmission times. If the user equipment has not received an uplink transmission resource when the SR counter reaches the preset maximum quantity of transmission times, the releasing unit may release the SR resource, and the determining unit 13 determines the target request resource from the request resources based on the time information of the user equipment. Alternatively, if the user equipment has not received an uplink transmission resource when the SR counter exceeds the preset maximum quantity of transmission times, the releasing unit may release the SR resource, and the determining unit 12 may determine the target request resource from the request resources based on the time information of the user equipment.

In one embodiment, a seventh starting unit starts an SR prohibition timer; if an SR counter has not been started, an eighth starting unit starts the SR counter; and if the user equipment has not received an uplink transmission resource when a preset timeout interval of the SR prohibition timer expires and before the SR counter reaches a preset maximum quantity of transmission times, the determining unit 13 determines a target request resource from the request resources based on the time information of the user equipment; and the releasing unit releases the SR resource if the user equipment has not received an uplink transmission resource when the SR counter reaches the preset maximum quantity of transmission times; and if the SR resource is released but preamble sending is not prohibited, and if the target request resource is the PRACH resource, the sending unit 14 sends a preamble to the base station by using the PRACH resource.

In one embodiment, the user equipment may respectively control an SR prohibition time and a quantity of SR sending times by using the SR prohibition timer and the SR counter. For example, it may be specified that after the SR is sent by using the SR resource, the SR prohibition timer is started, and SR sending is prohibited in a preset time until the timeout interval expires. When the preset timeout interval of the SR prohibition timer expires, the SR counter may start to work. If the user equipment has not received an uplink transmission resource before the SR counter reaches the preset maximum quantity of transmission times, the determining unit 13 continues to determine the target request resource from the request resources based on the time information of the user equipment. If a quantity of SR sending times that is obtained by using the SR counter reaches the preset maximum quantity of transmission times, the SR resource is released regardless of a status of the SR prohibition timer. If preamble sending is not prohibited at this moment, and if the target request resource is the PRACH resource, the sending unit 14 sends the preamble to the base station by using the PRACH resource. If preamble sending has been prohibited, the user equipment takes no action, or may instruct an upper-layer protocol stack to perform processing. Alternatively, a preamble prohibition condition may be that the user equipment has not received an uplink transmission resource when a quantity of preamble sending times that is obtained by using the preamble counter exceeds the preset maximum quantity of transmission times.

In one embodiment, if downlink control information DCI sent by the base station is received, the setting unit may prolong receiving duration of a window timer or start a window timer whose receiving duration is set; and if no random access response RAR sent by the base station is received within the receiving duration, the sending unit 14 may send the uplink resource request to the base station by using the target request resource.

In one embodiment, the downlink control information DCI may be used as common indication information for a cell, and may be used to determine that the base station successfully obtains a channel resource. To avoid a waste of excessive resources required for sending the target request, the window timer is disposed in the user equipment, and may be configured to: after the preamble is sent by using the PRACH resource, time a preset time for receiving a message indicating that the base station successfully allocates the channel resource. The window timer whose receiving duration is set may be started, or the receiving duration of the window timer may be prolonged based on an actual requirement. If no random access response RAR sent by the base station is received within the receiving duration, it indicates that the channel resource fails to be transmitted, and then the determining unit 13 may determine a target request resource from the request resources based on the time information of the user equipment. For example, after the preamble is sent by using the PRACH resource, when the receiving duration of the window timer is set to 5 s, if no RAR is received after 5 s, the determining unit 13 may determine the target request resource from the request resources based on the time information of the user equipment. In this case, the target request resource may be a PRACH resource different from the previous PRACH resource in time domain, or may be an SR resource different from the previous SR resource in time domain. Preferably, the RAR is sent by using the first-type cell. If the downlink control information DCI sent by the base station is received, the determining unit 13 may determine that the first-type cell has successfully obtained the channel resource.

In one embodiment, if the transmit channel of the target request is not idle, the determining unit 13 may determine a target request resource from the request resources based on the time information of the user equipment.

In one embodiment, if the transmit channel of the target request is not idle, the determining unit 13 determines the target request resource from the request resources based on the time information of the user equipment. In this embodiment of the present invention, if the transmit channel is not idle, it indicates that data cannot be currently sent on the channel, and the determining unit 13 needs to determine a new target request resource from the request resources based on the cell time information.

It may be learned that in this embodiment of the present invention, if the first configuration information sent by the base station is received, and it is learned, based on the first configuration information, that the request resources belong to the first-type cell, the request resources may be obtained from the first-type cell. The first-type cell includes the cell in which CCA detection needs to be performed before to-be-transmitted data is sent. The target request resource may be determined from the request resources according to the time precedence principle and based on the time information of the user equipment, and it is determined whether the transmit channel of the target request is idle. Then, if the transmit channel is idle, the user equipment sends the uplink resource request to the base station by using the target request resource. In this embodiment of the present invention, the uplink transmission resource is obtained when the transmission resource belongs to the first-type cell, and the target request resource is determined based on the time precedence principle, so that uplink transmission resource obtaining efficiency is improved more effectively.

Figure 7:
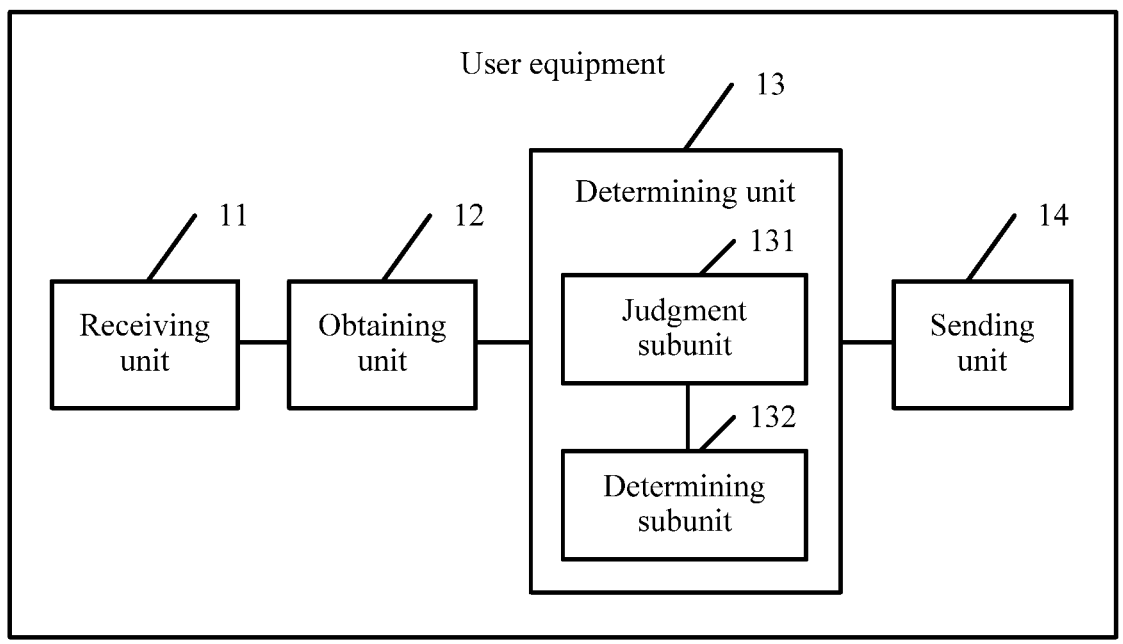
FIG. 7 is a schematic modular diagram of still another user equipment according to an embodiment of the present invention.

Referring to FIG. 7, FIG. 7 is a schematic modular diagram of still another user equipment according to an embodiment of the present invention. As shown in FIG. 7, the user equipment may include a receiving unit 11, an obtaining unit 12, a determining unit 13, and a sending unit 14.

The receiving unit 11 is configured to receive first configuration information sent by an base station.

The obtaining unit 12 is configured to: if learning, based on the first configuration information, that the PRACH resource belongs to a first-type cell and an SR resource belongs to a second-type cell, respectively obtain the PRACH resource and the SR resource from the first-type cell and the second-type cell.

In one embodiment, the receiving unit 11 receives the first configuration information sent by the base station; and if the obtaining unit 12 learns, based on the first configuration information, that the PRACH resource belongs to the first-type cell and the SR resource belongs to the second-type cell, the obtaining unit 12 respectively obtains the PRACH resource and the SR resource from the first-type cell and the second-type cell. The first-type cell includes a cell in which CCA detection needs to be performed before to-be-transmitted data is sent, and the second-type cell includes a cell in which CCA detection does not need to be performed before to-be-transmitted data is sent. When the user equipment obtains to-be-transmitted data, before sending the to-be-transmitted data, the user equipment needs to apply to the base station for an uplink transmission resource, so that the base station makes a scheduling decision after receiving the application, to determine whether to provide a corresponding service for the user equipment. In this embodiment of the present invention, based on the first configuration information of the base station, the obtaining unit 12 may obtain the SR resource from the second-type cell, and the sending unit 14 may send an SR to the base station by using the SR resource, to apply to the base station for the uplink transmission resource; or the obtaining unit 12 may obtain the PRACH resource from the first-type cell, and the sending unit 14 may send a preamble by using the PRACH resource, to apply to the base station for the uplink transmission resource. To obtain the uplink transmission resource as quickly as possible, the base station configures both the SR resource and the PRACH resource for the user equipment, so as to help the user equipment apply for the uplink transmission resource. The base station may send SR resource configuration information to the user equipment in a unicast manner, or may send PRACH resource configuration information to the user equipment in a unicast or broadcast manner. The user equipment may obtain request resources by receiving the first configuration information sent by the base station. The first configuration information may include the SR resource configuration information and/or the PRACH resource configuration information. The request resources may include a time period, a frequency, a starting time, and other information, and may be classified into the SR resource and the PRACH resource.

The determining unit 13 determines a target request resource from the request resources based on time information of the user equipment, where the target request resource includes the SR resource or the PRACH resource.

In one embodiment, the determining unit 13 may include a judgment subunit 131 and a determining subunit 132.

The judgment subunit 131 is configured to: if the SR resource in the request resources is obtained from the second-type cell, determine a priority of the to-be-transmitted data of the user equipment based on second configuration information received from the base station.

In one embodiment, if the SR resource in the request resources is obtained from the second-type cell, the judgment subunit 131 determines the priority of the to-be-transmitted data of the user equipment based on the second configuration information received from the base station. The second configuration information includes a priority that is of the to-be-transmitted data and that is specified by the base station, and priority mapping may be performed on the to-be-transmitted data of the user equipment based on the second configuration information. Priorities may be classified into a first priority and a second priority, which are respectively corresponding to a high priority and a low priority. This may be set by the base station based on quality of service (Quality of Service, QoS). In this embodiment of the present invention, the priorities are not limited to the foregoing two priorities, and may further include a possible third priority, fourth priority, and the like.

The determining subunit 132 is configured to: if the to-be-transmitted data of the user equipment includes only first-priority data, determine, from the request resources based on the time information of the user equipment, that the target request resource is the SR resource.

In one embodiment, if the to-be-transmitted data of the user equipment includes only the first-priority data, the determining subunit 132 determines, from the request resources based on the time information of the user equipment, that the target request resource is the SR resource. In this embodiment of the present invention, all the request resources, for example, the SR resource or the PRACH resource, obtained by the user equipment are periodical spectrum resources. The time information of the user equipment is a current clock of the user equipment, and may further include the time period, the starting time, and other information that are configured by the base station. A number of a subframe in which the user equipment is currently scheduled, for example, a subframe in which the user equipment is scheduled at a current moment, may be determined based on the time information. A time location of the subframe in which the user equipment is currently scheduled may be obtained based on cell time information, and the determining subunit 132 may determine the target request resource from the request resources based on the time location of the current subframe and a preset principle. If the to-be-transmitted data of the user equipment includes only the first-priority data, namely, high-priority data, the determining subunit 132 may directly determine that the target request resource is the SR resource, and the target PRACH resource cannot be used as the target request resource.

The determining subunit 132 is further configured to: if the to-be-transmitted data of the user equipment includes second-priority data, determine the target request resource from the request resources according to a time precedence principle and based on the time information of the user equipment.

In one embodiment, if the to-be-transmitted data of the user equipment includes the second-priority data, the determining subunit 132 determines the target request resource from the request resources according to the time precedence principle and based on the time information of the user equipment. In this embodiment of the present invention, there may be two cases in which the to-be-transmitted data of the user equipment includes the second-priority data. In a first case, the to-be-transmitted data includes only the second-priority data. In a second case, the to-be-transmitted data includes the first-priority data and the second-priority data. In either of the cases, the target request resource may be determined from the request resources according to the time precedence principle and based on the time information of the user equipment, namely, "first-come first-used". The time precedence principle means that a request resource that can be first obtained from a moment corresponding to a subframe that is in a resource configuration timeline and in which the current user equipment is performing sending is determined by the determining subunit 132 as the target request resource based on the time information of the user equipment in the current user equipment.

In one embodiment, the determining subunit 132 is specifically configured to: if the SR resource is selected from the request resources according to the time precedence principle and based on the time information of the user equipment, use the SR resource as the target request resource; or if the PRACH resource is selected from the request resources according to the time precedence principle and based on the time information of the user equipment, use the PRACH resource as the target request resource; or if both the SR resource and the PRACH resource are selected from the request resources according to the time precedence principle and based on the time information of the user equipment, determine the target request resource from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In one embodiment, if the first obtained request resource is the SR resource, the determining subunit 132 may use the SR resource as the target request resource. If the first obtained request resource is the PRACH resource, the PRACH resource may be used as the target request resource. If the first obtained request resource is the SR resource and the PRACH resource, the target request resource may be determined based on a configuration requirement pre-specified by the base station. If the configuration information is the configuration information indicating that the SR resource takes precedence, the SR resource may be determined as the target request resource. If the configuration information is the configuration information indicating that the PRACH resource takes precedence, or the configuration information indicating that the SR resource and the PRACH resource take precedence, the PRACH resource or the like may be correspondingly set as the target request resource. In this embodiment of the present invention, the request resource in the second-type cell may be determined as the target request resource based on the configuration information.

The sending unit 14 is configured to send an uplink resource request to the base station by using the target request resource.

In one embodiment, if the target request resource is the PRACH resource, the sending unit 14 sends a preamble to the base station by using the PRACH resource.

In one embodiment, a first starting unit may start a preamble prohibition timer; and if the user equipment has not received a contention success message when a preset timeout interval of the preamble prohibition timer expires, the determining unit 13 may determine a target request resource from the request resources based on the time information of the user equipment.

In one embodiment, if a preamble counter has not been started, a second starting unit starts the preamble counter; or if the preamble counter has been started, counting is performed by using the preamble counter; and a first prohibition unit prohibits preamble sending if the user equipment has not received a contention success message when the preamble counter reaches a preset maximum quantity of transmission times.

In one embodiment, a third starting unit starts a preamble prohibition timer; and if a preamble counter has not been started, a fourth starting unit starts the preamble counter; or if the preamble counter has been started, counting is performed by using the preamble counter;

if the user equipment has not received a contention success message when a preset timeout interval of the preamble prohibition timer expires and before the preamble counter reaches a preset maximum quantity of transmission times, the determining unit 13 determines a target request resource from the request resources based on the time information of the user equipment; and a second prohibition unit prohibits preamble sending when the preamble counter reaches the preset maximum quantity of transmission times.

In one embodiment, if the target request resource is the SR resource, the sending unit 14 may send an SR to the base station by using the SR resource.

In one embodiment, a fifth starting unit is configured to start an SR prohibition timer; and if the user equipment has not received an uplink transmission resource when a preset timeout interval of the SR prohibition timer expires, the determining unit 13 may determine a target request resource from the request resources based on the time information of the user equipment.

In one embodiment, if an SR counter has not been started, a sixth starting unit starts the SR counter; or if the SR counter has been started, counting is performed by using the SR counter; and if the user equipment has not received an uplink transmission resource when the SR counter reaches a preset maximum quantity of transmission times, the releasing unit may release the SR resource, and the determining unit 13 determines a target request resource from the request resources based on the time information of the user equipment.

Optionally, a seventh starting unit starts an SR prohibition timer; if an SR counter has not been started, an eighth starting unit starts the SR counter; or if the SR counter has been started, counting is performed by using the SR counter; and if the user equipment has not received an uplink transmission resource when a preset timeout interval of the SR prohibition timer expires and before the SR counter reaches a preset maximum quantity of transmission times, the determining unit 13 determines a target request resource from the request resources based on the time information of the user equipment; and the releasing unit releases the SR resource if the user equipment has not received an uplink transmission resource when the SR counter reaches the preset maximum quantity of transmission times; and if the SR resource is released but preamble sending is not prohibited, and if the target request resource is the PRACH resource, the sending unit 14 sends a preamble to the base station by using the PRACH resource.

Further optionally, if downlink control information DCI sent by the base station is received, the setting unit may prolong receiving duration of a started window timer or start a window timer whose receiving duration is set; and if no random access response RAR sent by the base station is received within the receiving duration, the sending unit 14 may send the uplink resource request to the base station by using the target request resource.

For detailed descriptions of the foregoing steps, refer to the method embodiment corresponding to FIG. 3.

It may be learned that in this embodiment of the present invention, if the first configuration information sent by the base station is received, and it is learned, based on the first configuration information, that the PRACH resource belongs to the first-type cell and the SR resource belongs to the second-type cell, the PRACH resource and the SR resource are respectively obtained from the first-type cell and the second-type cell. If the SR resource in the request resources is obtained from the second-type cell, the priority of the to-be-transmitted data of the user equipment is determined based on the second configuration information received from the base station. If the to-be-transmitted data of the user equipment includes only the first-priority data, it is determined, from the request resources based on the time information of the user equipment, that the target request resource is the SR resource. If the to-be-transmitted data of the user equipment includes the second-priority data, the target request resource is determined from the request resources according to the time precedence principle and based on the time information of the user equipment, and the uplink resource request is sent to the base station by using the target request resource. In this embodiment of the present invention, uplink channel transmission is obtained when the PRACH resource belongs to the first-type cell and the SR resource belongs to the second-type cell, target request data is determined based on a result of determining the priority of the to-be-transmitted data and the time precedence principle. Therefore, the user equipment can obtain the uplink transmission resource as quickly as possible.

Figure 8:
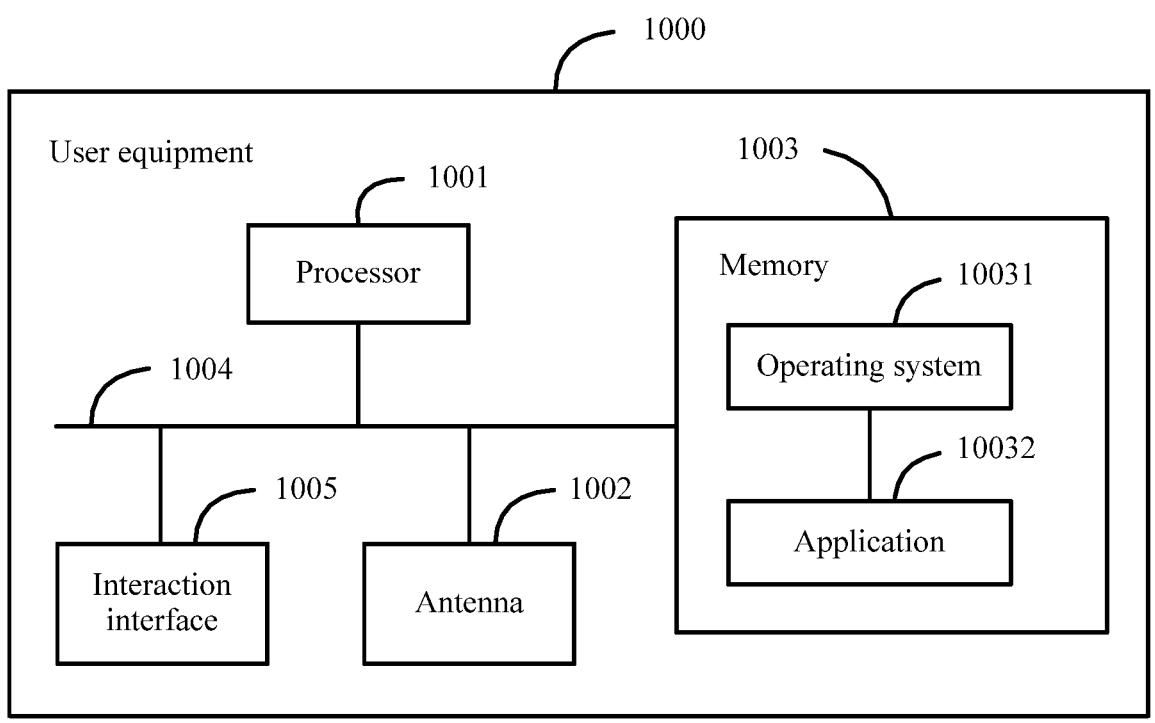
FIG. 8 is a schematic structural diagram of user equipment according to an embodiment of the present invention.

Referring to FIG. 8, user equipment according to an embodiment of the present invention is described in FIG. 8. Referring to FIG. 8, FIG. 8 is a schematic structural diagram of user equipment 1000 according to an embodiment of the present invention. As shown in FIG. 8, the user equipment may include at least one processor 1001 such as a CPU, at least one antenna 1002, a memory 1003, at least one communications bus 1004, and an interaction interface 1005. The communications bus 1004 is configured to implement connection and communication between the components. The antenna 1002 may be configured to send/receive information data. The memory 1003 may include a high-speed RAM memory, and may further include a nonvolatile memory (non-volatile memory), for example, at least one magnetic disk storage. Optionally, the memory 1003 may include at least one storage user equipment that is far away from the processor 1001.

In some implementations, the memory 1003 stores the following elements: an executable module or a data structure, or a subset thereof, or an extended set thereof:

an operating system 10031, including various system programs, and configured to: implement various basic services and process a hardware-based task; and an application program 10032, including various application programs such as a device control service program and a device identification service program, and configured to implement various application services.

In some implementations, the interaction interface 1005 may be configured to input/output information, and may include a monitor 10051 and a keyboard 10052.

In one embodiment, the processor 1001 is configured to invoke a program stored in the memory 1003, to perform the following operations:

receiving first configuration information sent by an base station, and obtaining request resources based on the first configuration information, where the request resources include an SR resource and a PRACH resource;

determining a target request resource from the request resources based on time information of user equipment, where the target request resource includes the SR resource and/or the PRACH resource; and sending an uplink resource request to the base station by using the target request resource.

In an embodiment, the obtaining request resources based on the first configuration information includes:

if learning, based on the first configuration information, that the request resources belong to a first-type cell, obtaining the request resources from the first-type cell; or if learning, based on the first configuration information, that the PRACH resource belongs to a first-type cell and the SR resource belongs to a second-type cell, respectively obtaining the request resources from the first-type cell and the second-type cell.

The first-type cell includes a cell in which CCA detection needs to be performed before to-be-transmitted data is sent, and the second-type cell includes a cell in which CCA detection does not need to be performed before to-be-transmitted data is sent.

In an embodiment, the determining a target request resource from the request resources based on time information of user equipment includes:

if the SR resource in the request resources is obtained from the second-type cell, determining a priority of the to-be-transmitted data of the user equipment based on second configuration information received from the base station; and if the to-be-transmitted data of the user equipment includes only first-priority data, determining, from the request resources based on the time information of the user equipment, that the target request resource is the SR resource; or if the to-be-transmitted data of the user equipment includes second-priority data, determining the target request resource from the request resources according to a time precedence principle and based on the time information of the user equipment.

In an embodiment, the determining a target request resource from the request resources based on time information of user equipment includes:

if the request resources are obtained from the first-type cell, determining the target request resource from the request resources according to a time precedence principle and based on the time information of the user equipment.

In an embodiment, the determining a target request resource from the request resources based on time information of user equipment includes:

if the SR resource is selected from the request resources according to the time precedence principle and based on the time information of the user equipment, using the SR resource as the target request resource; or if the PRACH resource is selected from the request resources according to the time precedence principle and based on the time information of the user equipment, using the PRACH resource as the target request resource; or if both the SR resource and the PRACH resource are selected from the request resources according to the time precedence principle and based on the time information of the user equipment, determining the target request resource from the request resources based on third configuration information, where the third configuration information includes configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

In an embodiment, the sending an uplink resource request to the base station by using the target request resource includes:

if the target request resource is the SR resource, sending an SR to the base station by using the SR resource; or if the target request resource is the PRACH resource, sending a preamble to the base station by using the PRACH resource.

In an embodiment, before the sending a target request by using the target request resource, to obtain an uplink transmission resource, the following operations are included:

if the request resources are obtained from the first-type cell, determining whether a transmit channel of the target request is idle; and if the transmit channel of the target request is idle, performing the step of sending an uplink resource request to the base station by using the target request resource; or if the transmit channel of the target request is not idle, performing the step of determining a target request resource from the request resources based on time information of user equipment.

In an embodiment, after the sending an uplink resource request to the base station by using the target request resource, the following operations are included:

if downlink control information DCI sent by the base station is received, prolonging receiving duration of a started window timer or starting a window timer whose receiving duration is set; and if no random access response RAR sent by the base station is received within the receiving duration, performing the step of sending an uplink resource request to the base station by using the target request resource.

In an embodiment, after the sending a preamble to the base station by using the PRACH resource, the following operations are included:

starting a preamble prohibition timer; and if the user equipment has not received a contention success message when a preset timeout interval of the preamble prohibition timer expires, performing the step of determining a target request resource from the request resources based on time information of user equipment.

In an embodiment, after the sending a preamble to the base station by using the PRACH resource, the following operations are included:

if a preamble counter has not been started, starting the preamble counter; or if the preamble counter has been started, performing counting by using the preamble counter; and prohibiting preamble sending if the user equipment has not received a contention success message when the preamble counter reaches a preset maximum quantity of transmission times.

In an embodiment, after the sending a preamble to the base station by using the PRACH resource, the following operations are included:

starting a preamble prohibition timer;

if a preamble counter has not been started, starting the preamble counter; or if the preamble counter has been started, performing counting by using the preamble counter;

if the user equipment has not received a contention success message when a preset timeout interval of the preamble prohibition timer expires and before the preamble counter reaches a preset maximum quantity of transmission times, performing the step of determining a target request resource from the request resources based on time information of user equipment; and prohibiting preamble sending when the preamble counter reaches the preset maximum quantity of transmission times.

In an embodiment, after the sending an SR to the base station by using the SR resource, the following operations are included:

starting an SR prohibition timer; and if the user equipment has not received an uplink transmission resource when a preset timeout interval of the SR prohibition timer expires, performing the step of determining a target request resource from the request resources based on time information of user equipment.

In an embodiment, after the sending an SR to the base station by using the SR resource, the following operations are included:

if an SR counter has not been started, starting the SR counter; or if the SR counter has been started, performing counting by using the SR counter; and if the user equipment has not received an uplink transmission resource when the SR counter reaches a preset maximum quantity of transmission times, releasing the SR resource, and performing the step of determining a target request resource from the request resources based on time information of user equipment.

In an embodiment, after the sending an SR to the base station by using the SR resource, the following operations are included:

starting an SR prohibition timer;

if an SR counter has not been started, starting the SR counter; or if the SR counter has been started, performing counting by using the SR counter;

if the user equipment has not received an uplink transmission resource when a preset timeout interval of the SR prohibition timer expires and before the SR counter reaches a preset maximum quantity of transmission times, performing the step of determining a target request resource from the request resources based on time information of user equipment;

releasing the SR resource if the user equipment has not received an uplink transmission resource when the SR counter reaches the preset maximum quantity of transmission times; and if the SR resource is released but preamble sending is not prohibited, performing the step: if the target request resource is the PRACH resource, sending a preamble to the base station by using the PRACH resource.

It may be learned from the foregoing descriptions that, in this embodiment of the present invention, after receiving the first configuration information sent by the base station, the user equipment may obtain the request resources based on the first configuration information, where the request resources include the SR resource and the PRACH resource; then determine the target request resource from the request resources based on the time information of the user equipment, where the target request resource includes the SR resource and/or the PRACH resource; and finally send the uplink resource request to the base station by using the target request resource. The SR resource and the PRACH resource are combined, and at least one resource is selected as the target request resource based on the cell time information, to send the uplink resource request to the base station. Therefore, a resource obtaining time can be shortened, and uplink transmission resource obtaining efficiency can be improved.

An embodiment of the present invention further includes a computer readable storage medium that stores one or more programs, and the one or more programs include an instruction. When being executed by user equipment that includes an antenna and a plurality of application programs, the instruction is used by the user equipment to perform the methods in FIG. 1 to FIG. 4.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments may be performed. The storage medium may be a magnetic disk, an optical disc, a read-only memory (Read-Only Memory, ROM), a random access memory (Random Access Memory, RAM), or the like.

What are disclosed above are merely examples of embodiments of the present invention, and certainly are not intended to limit the scope of the claims of the present invention. Therefore, equivalent variations made in accordance with the claims of the present invention shall fall within the scope of the present invention.

What is claimed is:

1. A transmission resource obtaining method, comprising:
receiving first configuration information from a base station, and obtaining request resources based on the first configuration information, wherein the request resources comprise a scheduling request (SR) resource and a physical random access channel (PRACH) resource;
determining a target request resource from the request resources based on time information of user equipment, wherein the target request resource comprises one or more of the SR resource and the PRACH resource; and
sending an uplink resource request to the base station by using the target request resource.

2. The method according to claim 1, wherein the obtaining request resources based on the first configuration information comprises:
if learning, based on the first configuration information, that the request resources belong to a first-type cell, obtaining the request resources from the first-type cell; or
if learning, based on the first configuration information, that the PRACH resource belongs to the first-type cell and the SR resource belongs to a second-type cell, obtaining the request resources from the first-type cell and the second-type cell respectively, wherein
the first-type cell comprises a cell in which a clear channel assessment (CCA) detection needs to be performed before data to be transmitted is sent, and the second-type cell comprises a cell in which a CCA detection does not need to be performed before the to-be-transmitted data is sent.

3. The method according to claim 2, wherein the determining a target request resource from the request resources based on time information of user equipment comprises:
if the SR resource in the request resources is obtained from the second-type cell, determining a priority of the to-be-transmitted data of the user equipment based on second configuration information received from the base station; and
if the to-be-transmitted data of the user equipment comprises only first-priority data, determining, from the request resources based on the time information of the user equipment, that the target request resource is the SR resource; or if the to-be-transmitted data of the user equipment comprises second-priority data, determining the target request resource from the request resources according to a time precedence principle and based on the time information of the user equipment.

4. The method according to claim 2, wherein the determining a target request resource from the request resources based on time information of user equipment comprises:
if the request resources are obtained from the first-type cell, determining the target request resource from the request resources according to a time precedence principle and based on the time information of the user equipment.

5. The method according to claim 3, wherein the determining a target request resource from the request resources based on time information of user equipment comprises:
if the SR resource is selected from the request resources according to the time precedence principle and based on the time information of the user equipment, using the SR resource as the target request resource; or
if the PRACH resource is selected from the request resources according to the time precedence principle and based on the time information of the user equipment, using the PRACH resource as the target request resource; or if both the SR resource and the PRACH resource are selected from the request resources according to the time precedence principle and based on the time information of the user equipment, determining the target request resource from the request resources based on third configuration information, wherein the third configuration information comprises configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

6. The method according to claim 1, wherein the sending an uplink resource request to the base station by using the target request resource comprises:
if the target request resource is the SR resource, sending an SR to the base station using the SR resource; or
if the target request resource is the PRACH resource, sending a preamble to the base station using the PRACH resource.

7. The method according to claim 6, wherein before sending a target request by using the target request resource, to obtain an uplink transmission resource, the method further comprises:
if the request resources are obtained from the first-type cell, determining whether a transmit channel of the target request is idle; and
if the transmit channel of the target request is idle, performing the sending an uplink resource request to the base station using the target request resource; or
if the transmit channel of the target request is not idle, performing the determining a target request resource from the request resources based on time information of user equipment.

8. The method according to claim 6, wherein after sending an uplink resource request to the base station by using the target request resource, the method further comprises:
if downlink control information (DCI) sent by the base station is received, prolonging receiving duration of a started window timer or starting a window timer whose receiving duration is set; and
if no random access response (RAR) sent by the base station is received within the receiving duration, performing the step of sending an uplink resource request to the base station by using the target request resource.

9. The method according to claim 6, wherein after sending a preamble to the base station by using the PRACH resource, the method further comprises:
   starting a preamble prohibition timer; and
   if the user equipment has not received a contention success message when a preset timeout interval of the preamble prohibition timer expires, performing the step of determining a target request resource from the request resources based on time information of user equipment.

10. User equipment, comprising:
   a receiver configured to receive first configuration information sent by a base station;
   a processor configured to obtain request resources based on the first configuration information, wherein the request resources comprise a scheduling request (SR) resource and a physical random access channel (PRACH) resource; and determine a target request resource from the request resources based on time information of the user equipment, wherein the target request resource comprises one or more of the SR resource and the PRACH resource; and
   a transmitter configured to send an uplink resource request to the base station by using the target request resource.

11. The user equipment according to claim 10, wherein the receiver is further configured to:
   if learning, based on the first configuration information, that the request resources belong to a first-type cell, obtain the request resources from the first-type cell; or
   if learning, based on the first configuration information, that the PRACH resource belongs to the first-type cell and the SR resource belongs to a second-type cell, obtain the request resources from the first-type cell and the second-type cell respectively, wherein
   the first-type cell comprises a cell in which a clear channel assessment (CCA) detection needs to be performed before data to be transmitted is sent, and the second-type cell comprises a cell in which a CCA detection does not need to be performed before the to-be-transmitted data is sent.

12. The user equipment according to claim 11, wherein the processor further configured to:
   if the SR resource in the request resources is obtained from the second-type cell, determine a priority of the to-be-transmitted data of the user equipment based on second configuration information received from the base station;
   if the to-be-transmitted data of the user equipment comprises only first-priority data, determine, from the request resources based on the time information of the user equipment, that the target request resource is the SR resource;
   if the to-be-transmitted data of the user equipment comprises second-priority data, determine the target request resource from the request resources according to a time precedence principle and based on the time information of the user equipment.

13. The user equipment according to claim 11, wherein the processor is further configured to:
   if the request resources are obtained from the first-type cell, determine the target request resource from the request resources according to a time precedence principle and based on the time information of the user equipment.

14. The user equipment according to claim 13, wherein the processor is further configured to:
   if the SR resource is selected from the request resources according to the time precedence principle and based on the time information of the user equipment, use the SR resource as the target request resource; or
   if the PRACH resource is selected from the request resources according to the time precedence principle and based on the time information of the user equipment, use the PRACH resource as the target request resource; or
   if both the SR resource and the PRACH resource are selected from the request resources according to the time precedence principle and based on the time information of the user equipment, determine the target request resource from the request resources based on third configuration information, wherein the third configuration information comprises configuration information indicating that the SR resource takes precedence, configuration information indicating that the PRACH resource takes precedence, configuration information indicating that the SR resource and the PRACH resource take precedence, or configuration information indicating that a request resource in the second-type cell takes precedence.

15. The user equipment according to claim 13, wherein the transmitter is further configured to:
   if the target request resource is the SR resource, send an SR to the base station by using the SR resource; or
   if the target request resource is the PRACH resource, send a preamble to the base station by using the PRACH resource.

16. The user equipment according to claim 15, wherein the processor is further configured to: if the request resources are obtained from the first-type cell, determine whether a transmit channel of the target request is idle;
   the transmitter is further configured to: if the transmit channel of the target request is idle, send the uplink resource request to the base station by using the target request resource; and
   the receiver is further configured to: if the transmit channel of the target request is not idle, determine a target request resource from the request resources based on the time information of the user equipment.

17. The user equipment according to claim 16, wherein the processor is further configured to: if downlink control information DCI sent by the base station is received, prolong receiving duration of a started window timer or start a window timer whose receiving duration is set; and
   the sending unit is specifically configured to: if no random access response RAR sent by the base station is received within the receiving duration, send the uplink resource request to the base station by using the target request resource.

18. The user equipment according to claim 17, wherein the processor is further configured to start a preamble prohibition timer; and if the user equipment has not received a contention success message when a preset timeout interval of the preamble prohibition timer expires, determine a target request resource from the request resources based on the time information of the user equipment.

* * * * *